United States Patent [19]

Nigawara et al.

[11] Patent Number: 5,771,043
[45] Date of Patent: Jun. 23, 1998

[54] METHOD AND APPARATUS FOR DISPLAYING OPERATING PROCEDURE

[75] Inventors: Seiitsu Nigawara; Takehiko Ikematsu; Hiroshi Kohmoto, all of Hitachi, Japan

[73] Assignee: Hitachi, Ltd., Tokyo, Japan

[21] Appl. No.: 293,420

[22] Filed: Aug. 22, 1994

Related U.S. Application Data

[63] Continuation of Ser. No. 181,889, Jan. 14, 1994, abandoned, which is a continuation of Ser. No. 742,607, Aug. 8, 1991, abandoned.

[30] Foreign Application Priority Data

Aug. 22, 1990 [JP] Japan ..................... 2-218920

[51] Int. Cl.$^6$ .............. G06T 15/70; G06F 3/14
[52] U.S. Cl. .......... 345/419; 345/427; 345/355; 345/964; 345/473; 345/960
[58] Field of Search .................. 395/119, 127, 395/120, 152, 154, 161, 355, 964, 173, 174, 952, 953, 960, 336–338, 978; 364/512; 434/401, 369, 374, 428; 345/419, 427, 420, 355, 964, 473–474, 952–953, 336–338, 978

[56] References Cited

U.S. PATENT DOCUMENTS

| | | | |
|---|---|---|---|
| 4,275,449 | 6/1981 | Aish ..................... | 345/420 X |
| 4,700,318 | 10/1987 | Ockman .............. | 364/512 X |
| 4,868,766 | 9/1989 | Oosterholt .............. | 345/420 |
| 4,985,855 | 1/1991 | Aldrich et al. .......... | 364/512 X |
| 5,006,991 | 4/1991 | Ohcoshi et al. .......... | 345/420 X |
| 5,138,698 | 8/1992 | Aldrich et al. ............ | 345/427 |
| 5,179,654 | 1/1993 | Richards et al. ........... | 345/338 |
| 5,208,745 | 5/1993 | Quentin et al. ............ | 345/978 X |
| 5,247,433 | 9/1993 | Kitaura et al. ............ | 345/978 X |
| 5,367,622 | 11/1994 | Coggins ................ | 345/356 |

OTHER PUBLICATIONS

*Theory and Practice of Geometric Modeling*, "The Use of Geometric Models in Robotic Applications", E.G. Schlechtendahl, Springer, Berlin–Heidelberg, 1989, pp. 403–417.
*Proceedings ASME Flexible Assembly Conference*, "Automatic Generation of a Robotic Assembly Sequence", L. Laperriere, et al., Canada, 1989, pp. 15–22.

Primary Examiner—Raymond J. Bayerl
Attorney, Agent, or Firm—Antonelli, Terry, Stout & Kraus, LLP

[57] ABSTRACT

A display device or method for an operating procedure which enables an accurate transmission of an operating procedure of a target element to an operator, which enables the operator to understand the operating procedure promptly and rationally and which enables the operator to look at functional elements on the screen from a desired direction by the operation of the operator. Three-dimensional dynamic scene information is exploded based on three-dimensional scene information of mono-elements and three-dimensional procedure information which shows the handling procedure of functional elements. The three-dimensional scene information is structured by coordinates information of a desired reciprocal viewpoint and is displayed as exploded three-dimensional graphics in the display device. The coordinates information of a desired reciprocal viewpoint signifies a locus of time or a sequence of a variable which shows a reciprocal position and direction between an object and a viewpoint, and signifies time-series data of coordinates information which is suitable for showing the operating procedure.

87 Claims, 21 Drawing Sheets

| PART CODE | REFERENCE PART CODE | SIZE INFORMATION | INFORMATION OF STANDARD AND THE LIKE |
|---|---|---|---|
| B00001 | A00001 | $S_{B1}$ | |

41, 41a, 42b, 42c

| DEVICE (OR PART) CODE | PART CODE | PROCEDURE COORDINATES | PROCEDURE ROTATION | TIMING FUNCTION | | |
|---|---|---|---|---|---|---|
| C00001 | B00001 | $X_{B1}$ | $\theta_{B1}$ | $T_{B1}$ | | |

| REFERENCE PART CODE (61) | SIZE (62) | THREE-DIMENSIONAL GRAPHIC INFORMATION (63, 64) |
|---|---|---|
| A00001 | $S_{A1}$ | $G_{A1}$ |
| ⋮ | ⋮ | ⋮ |

FIG. 7

| DEVICE (OR PART) CODE (72) | HANDLING PROCEDURE MODE (73) | VOICE MESSAGE ANNUNCIATION SEQUENCE (74) | VOICE MESSAGE ANNUNCIATION INFORMATION (75) |
|---|---|---|---|
| C00001 | 0 | 1 | XXXX·········· |
|  | 0 | 2 | XXXX·········· |
|  | ⋮ | ⋮ |  |

| DEVICE (OR PART) CODE (82) | HANDLING PROCEDURE MODE (83) | CHARACTER DISPLAY SEQUENCE (84) | CHARACTER DISPLAY REFERENCE COORDINATES (85) | CHARACTER INFORMATION (86) |
|---|---|---|---|---|
| C00001 | 0 | 1 | $B_{01}$ | XXXX········ |
|  | 0 | 2 | $B_{02}$ | XXXX········ |
|  | ⋮ | ⋮ |  |  |

(81)

METHOD AND APPARATUS FOR DISPLAYING OPERATING PROCEDURE

This application is a continuation of application Ser. No. 08/181,889 filed Jan. 14, 1994, now abandoned, which is a continuation of application Ser. No. 07/742,607 filed Aug. 8, 1991, now abandoned.

BACKGROUND OF THE INVENTION

The present invention relates to a method and a unit for displaying, by a dynamic scene, an operating procedure for accurately transmitting to an operator a disassembling procedure and an assembling procedure of target functional elements or the like.

A prior art CAD system is disclosed in Hitachi Review, Vol. 172, Mar. 25, 1990, "The development of the Three-Dimensional Design and Manufacturing Supporting System "HICAD/W"".

In the disassembling and assembling procedures for target elements, there has been a problem that an operator can not recognize accurate geometric information just based on character information or cartoonic display when the objective elements become more complex, resulting in a malfunction or a trial-and-error operation which takes a long time.

There has also been a problem in the usual document manual or character information because an operator will have to spend some wasteful time before he learns correct operation steps if he does not know technical terms. Further, there has been a confusion in the understanding of the operator when a series of a plurality of operation procedures progress simultaneously. There is also a problem that, except a specialist who has cumulated some training, an operator will find it difficult to understand the output screen when the output is in the normal scene or when it is geometric information in the CAD system. For example, an operator will have to take substantial training before he can draw FIG. 23 on the basis of FIG. 22. FIG. 22 being a side view of a unit and FIG. 23 being a three-dimensional configuration of the unit, respectively. A video recorder and reproducer set is also an example which is used for displaying the method of an operating procedure with realistic display. However, an operator can obtain only limited information by this display method, and it is sometimes difficult for him to understand the geometric information included in the assembly or disassembly process by having a look at the drawings.

There is also a problem that the preparation of a video graphic display requires the presence of an actual object or model.

As described in the above-mentioned Hitachi Review, the conventional CAD system has shape generation and compilation functions as the three-dimensional graphic design and manufacturing supporting system and functions for integrating three-dimensional and two-dimensional data and operating and part-operating in an assembled product. The shape generation and compilation functions enable to generate a shape based on sum and difference operations of sets and enable to change a shape to a shape at a desired time by saving the shape generation and compilation processes.

In the case of the CAD, it can perform the above-described processings for geometric information. However, it lacks information of a complete flow of the operation procedure so that an operator can not progress the learning by taking an advantage of a three-dimensional display. Further, there is a problem that the operationability and the functions do not match the manual.

The above prior-art technique mainly uses the display of character information, supplementarily outputting a display of an operating procedure in a simplified drawing, an image display or a graphic display at designing level, as required. Therefore, unless an operator has a high-level education, this display method lacks accurate transmission to the operator of geometric information of elements to be operated when the operator wants to refer to the manual. This method also has a problem that it takes time for the operator to understand the content of the operating procedure.

In the case of the dynamic display by using a video set, for example, an operator can watch only the recorded scene, and he can not watch the state of the back side of a structural object on the screen in an assembly work.

SUMMARY OF THE INVENTION

In order to eliminate the above problems, it is an object of the present invention to provide a display unit or a display method for an operating procedure which accurately transmits to an operator an operating procedure of elements to be operated, which enables the operator to understand promptly and rationally the operating procedure and which enables the operator to watch the functional elements on the screen from any desired direction by the operation of the operator.

In order to achieve the above object, three-dimensional graphic information of a mono-element and three-dimensional procedure information which shows a handling procedure of functional elements are combined together to develop three-dimensional dynamic graphic information, which is structured based on coordinates information of a desired reciprocal viewpoint and which is displayed in a display unit as developed three-dimensional graphics. The coordinates information of a desired reciprocal viewpoint means a locus relating to time or sequence of variables showing a reciprocal position and a direction between an object and a viewpoint, which is time-series data of coordinates information which is suitable for showing the operating procedure.

In order to achieve the above object, character information, displayed by being superposed on the graphic information in synchronism with the graphic display, or the operating procedure is explained by voice.

Further, in order to achieve the above object, the content of the explanation of the operating procedure is displayed in a display unit either as character information or voice information which corresponds to the technical level requested by the operator.

Further, in order to achieve the above object, the three-dimensional information of a mono-element comprises an element code for specifiying the mono-element, shape coordinates information for showing the shape of the element and size coordinates information for showing the size of the element.

Further, in order to achieve the above object, the three-dimensional procedure information of the functional element or the total functional element comprises size and coordinates information of the mono-element or the functional element and operation procedure information of the mono-element or the functional element.

Further, in order to achieve the above object, the unit for showing the handling procedure of the functional element comprises a mono-element graphic information memory device, a graphic processor for processing the operating procedure in three-dimensional graphic information, a display unit for three-dimensional graphic information and a man-machine device for indicating the display in the graphic processor.

According to the present invention, the operating procedure of the functional element is graphically displayed as three-dimensional procedure information. By this arrangement, an operator can understand accurately and promptly the geometric information of the functional element and positional relationship between the elements.

When the operating procedure information is displayed as dynamic graphics, the operator can understand the operating procedure accurately and promptly.

When character information is superposed on the graphic display in synchronism with the graphic display or when the operating procedure is explained in voice in synchronism with the graphic display, the operator can recognize the operating procedure more clearly.

When the operating procedure information or explanation according to the tehcnical level of the operator is outputted in accordance with the request of the technical level by the operator, the method or the device of the present invention can be utilized to meet the level of the user, that is, the beginner's level or the specialist level, etc.

When the operator makes an active access to coordinates of a desired reciprocal viewpoint of three-dimensional dynamic graphic information, he can freely change the position or direction of the graphics of the dispalyed functional element. Thus the present invention can provide a display screen with high learning effect.

BRIEF DESCRIPTION OF THE DRAWINGS

FIG. 6 shows an information table of basic parts;

FIG. 7 shows a voice message annunciation information table;

FIG. 8 shows a character information table;

DESCRIPTION OF THE PREFERRED EMBODIMENTS

An embodiment of the present invention will be explained below with reference to the drawings.

The display device of the operating procedure and the functional structure of the operating method will be explained first based on FIG. 1.

Figure 1:
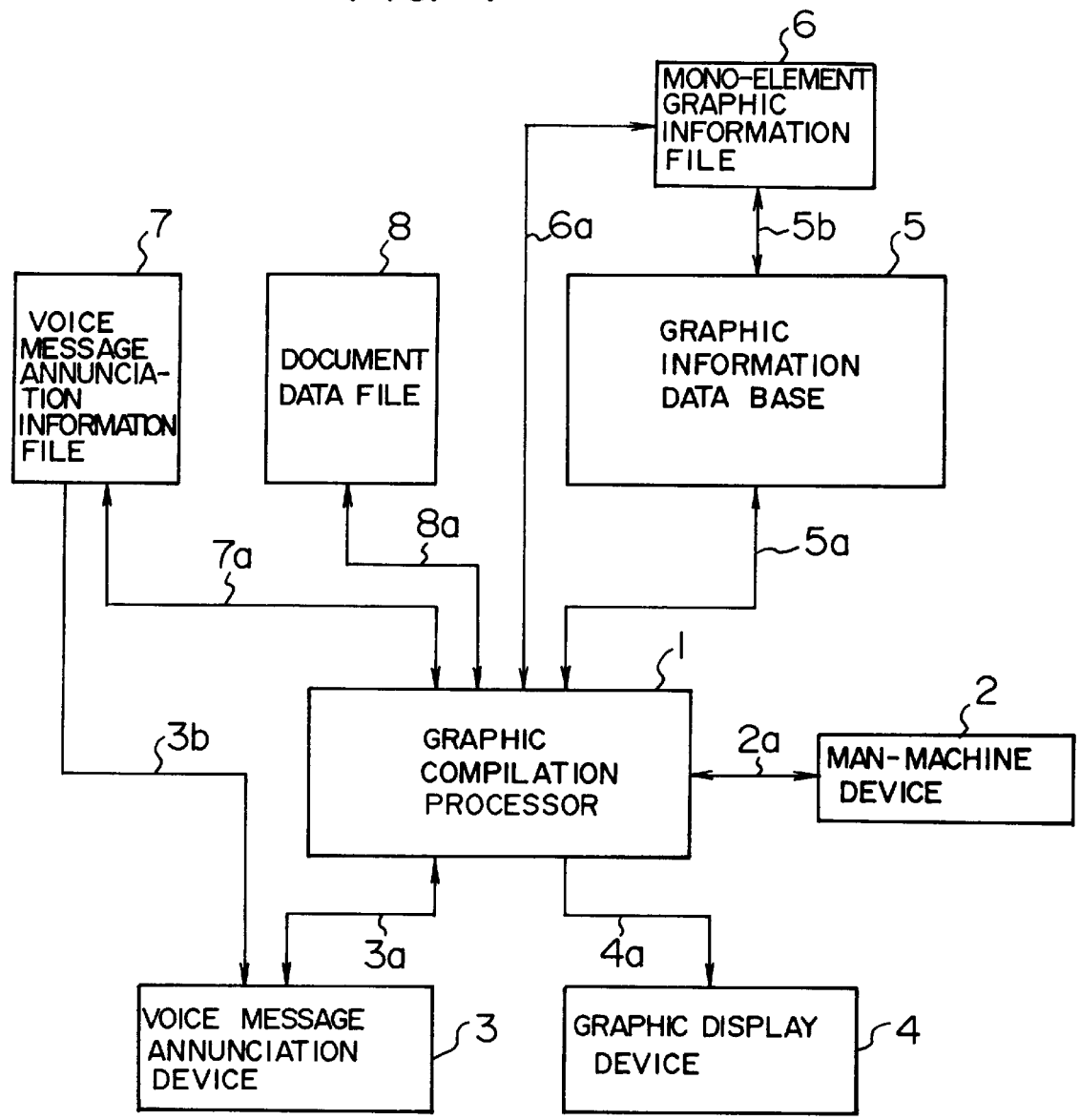
FIG. 1 is a configuration diagram relating to the display unit and method of the operating procedure according to the present invention.

In FIG. 1, the function comprises a graphic compilation processor 1, a man-machine device 2, a voice message annunciation equipment 3, a graphic display device 4, a graphic information data base 5, a graphic information file 6 for a mono-element (for example, a component part) and functional element (for example, a device), a voice message annunciation information file 7 and a document data file 8.

The graphic compilation processor 1 has function that it receives, through a man-machine/processor interface 2a, a handling procedure display instruction for a functional element or a total functional element which instruction is requested by the operator and inputted by the man-machine device 2, transmits a load instruction of three-dimensional procedure information which shows the handling procedure of the functional element or the total functional element, to the graphic information data base 5, through a data base/processor interface 5a, and loads the three-dimensional procedure information through the data base/processor interface 5a for temporary storage of the three-dimensional procedure information. Similarly, the graphic compilation processor has functions that it receives the handling procedure display information through the man-machine/procedure interface 2a, transmits the load instruction of three-dimensional graphic information of the basic element, to the mono-element graphic information file 6, through a graphic information file/processor interface 6a, and loads the three-dimensional graphic information through the graphic information file/processor interface 6a for temporary storage of the three-dimensional graphic information.

The graphic compilation processor 1 also has a function of exploding the handling procedure of the functional element or the total functional element in three-dimensional graphic information from the read three-dimensional graphic information of a mono-element or the three-dimensional procedure information which shows the handling procedure of the functional element or the total functional element, and a function of making the three-dimensional graphic information into dynamic graphics by using a handling procedure dynamic graphic program. The graphic compilation processor 1 also has a function for transmitting the three-dimensional graphic information or dynamic information of the exploded handling procedure, to the graphic display device 4 through a graphic display file/processor interface 4a, and for making a display of the transmitted information. Further, the graphic compilation processor 1 has a function that it reads character information corresponding to the three-dimensional procedure information that has been read in advance from the character information file 8 through a graphic information file/processor interface 8a, and displays the character information in synchronism with a suitable position and timing of the three-dimensional graphics or dynamic graphics that are displayed by the graphic display device 4.

Further, the graphic compilation processor 1 has a function that it reads voice message annunciation information corresponding to the three-dimensional procedure information that has been read in advance from the voice message annunciation information file 7 through a voice message annunciation information file/processor interface 7a, and annunciates a voice mesage in synchronism with the timing of the three-dimensional graphics or dynamic graphics that are displayed in advance in the graphic display device 4 by the voice message annunciation device 3.

Further, the graphic compilation processor 1 has a function for outputting the content of voice explanation of the operating procedure which has been prepared in advance in accordance with the request made by the operator of the technical level which request is inputted from the man-machine device 2 through the man-machine/processor interface 2a, or for outputting the character information which has been prepared in advance in accordance with the request of the technical level made by the operator.

Figure 2:
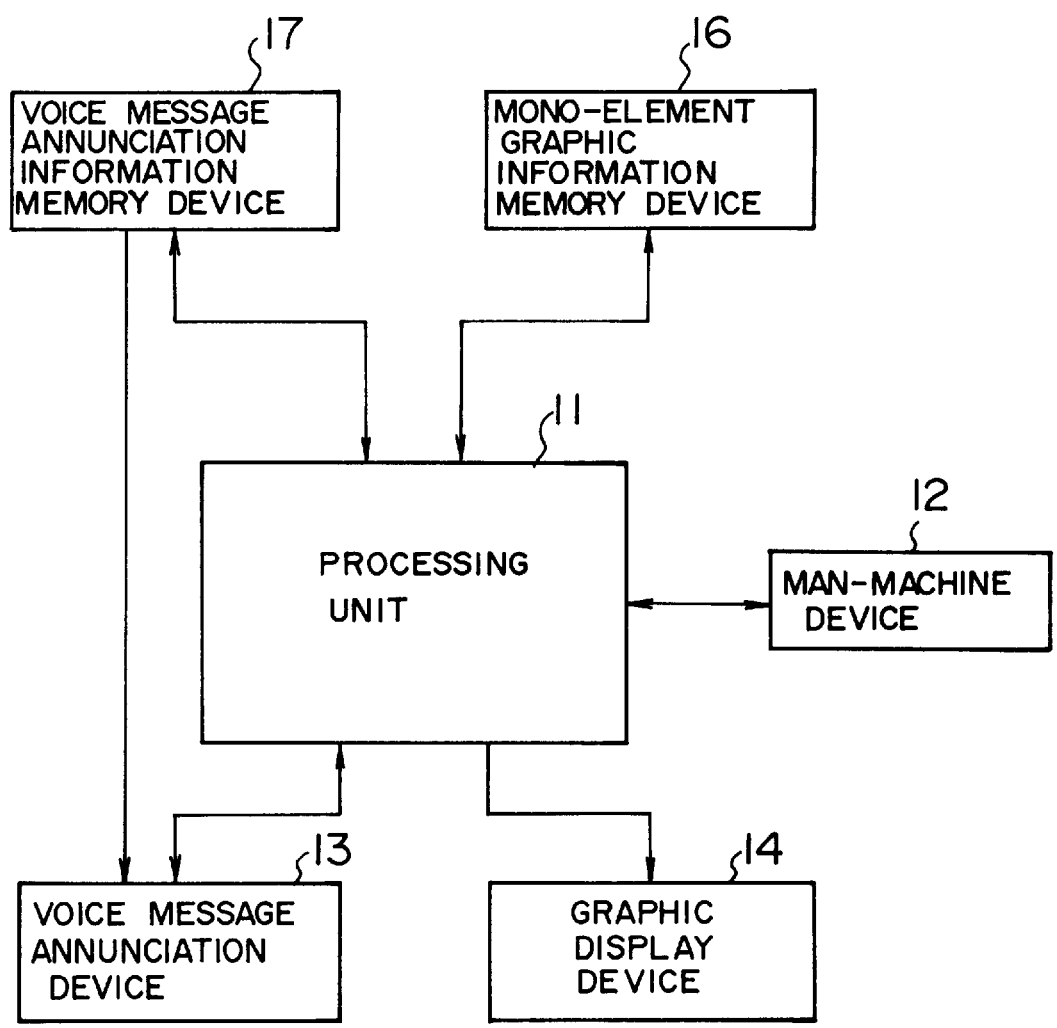
FIG. 2 is a basic configuration diagram of the display unit.

FIG. 2 shows an embodiment of the basic configuration diagram of the device.

In FIG. 2, three-dimensional graphic information of a desired device or part is generated within a processing unit 11 through a man-machine device 12, and shape data of more basic element is stored in a mono-element graphic information memory device 16 and it is read when necessary. In synchronism with the outputting of the visual data to the graphic display device 14, voice message annunciation information is transferred from a voice message annunciation information memory device 17 to a voice message annunciation device 13 and is outputted.

It is convenient to arrange the memory section of the mono-element graphic information memory device 16 in a cassette system or in an IC card system so that it can be expanded or modified to match the functional element. Actual operating procedure information and the like are stored in the data base of the processing unit 11 or in an external data base of the processing unit.

Next, a detailed explanation will be made of an example of the display device which generates three-dimensional graphic information based on mono-element three-dimensional graphic information and three-dimensional procedure information showing a handling procedure of a functional element and which displays the operating procedure by voice message annunciation or by characters in synchronism with a dynamic graphic display (however, the content of the dynamic graphic display is unchanged and the display image is not modified by an operator).

Figure 3:
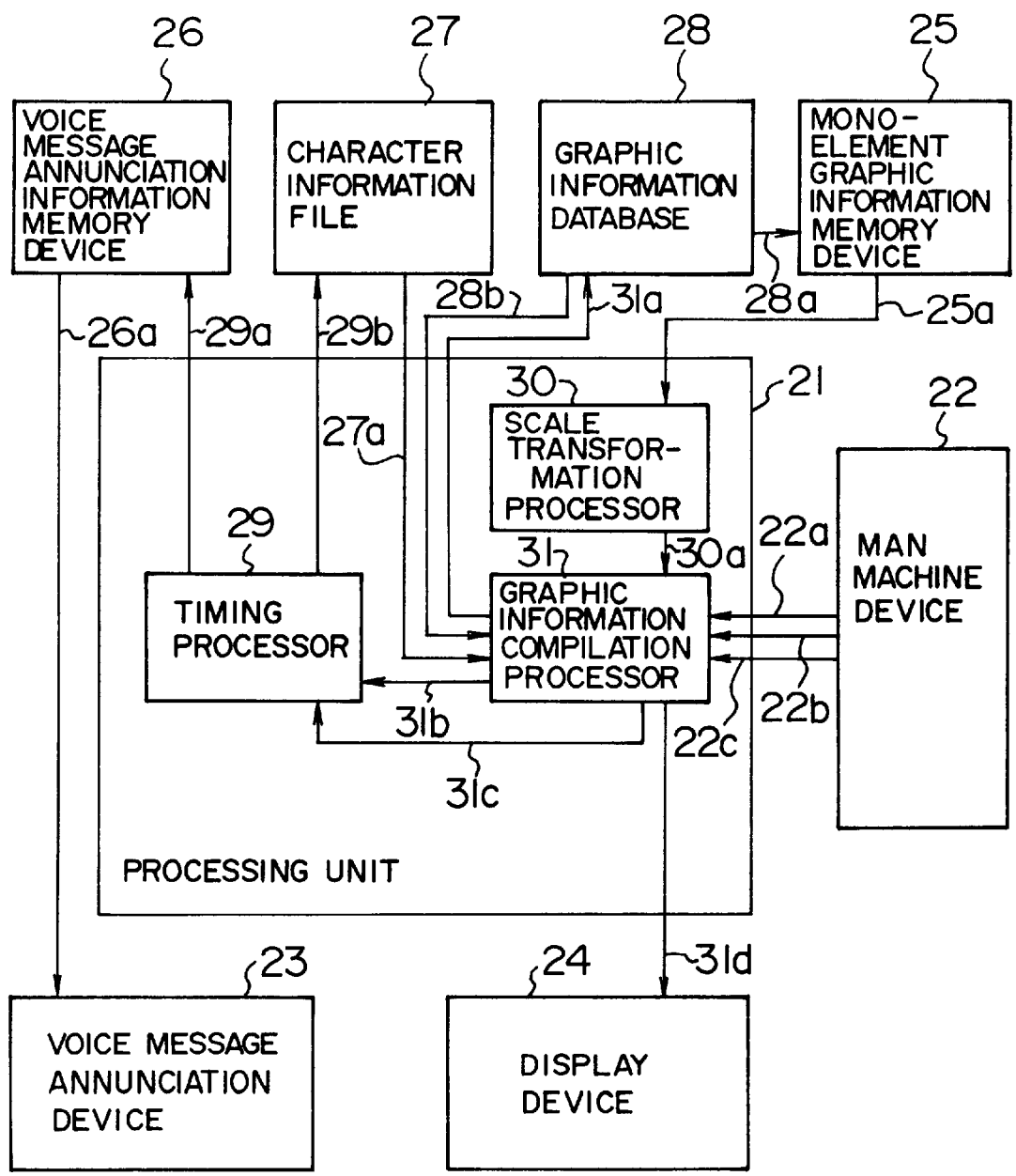
FIG. 3 is a configuration diagram of an embodiment according to the present invention.

FIG. 3 shows the device configuration diagram of the above-described device. A man-machine device 22 is an interface of an instruction input for outputting the operating procedure or graphic information requested by the operator. A display device 24 actually displays three-dimensional graphic information which shows the handling procedure requested by the operator. A voice message annunciation information memory device 26 is a memory device which stores voice message annunciation information that is outputted in synchronism with the content of display displayed in the display device 24. The voice message annunciation information is outputted to a voice message annunciation device 23 such as a tape recorder or a CD player. A graphic information data base 28 stores three-dimensional procedure information showing the handling procedure of the functional element or the total functional element. Three-dimensional graphic information of the mono- or functional element corresponding to the three-dimensional procedure information showing the handling procedure, the display of which has been requested by the operator, is read from a mono-element graphic information memory device 25 which is stored in the system and is transferred to a graphic information compilation processor 31 after having been scale-transformed by a scale transformation processor 30 within a processing unit 21. The scale transformation is a processing for exploding a similar figure that can be designated in a scalar time of a certain characteristic length in a mono- or functional element, into three-dimensional graphic information by suitably reading the similar shape as three-dimensional graphic information of standard mono-element, for the purpose of reducing the quantity of graphic information. A timing processor 29 within the processing unit 21 outputs the voice message annunciation information or character information to the display device in synchronism with the displayed graphics. The graphic information compilation processor 31 shows the handling procedure of the functional element or the total functional element, and has a function for exploding three-dimensional procedure information into three-dimensional graphic information and a function for controlling input and output of data or a signal in the process of the above processing.

In the embodiment of FIG. 3, the graphic information data base 28 and a character information file 27 for storing the three-dimensional procedure information which shows the handling procedure of the functional element or the total functional element are independently structured at the outside of the processing unit 21. However, these may be included inside the processing unit 21. The character information file 27 may be also stored in the graphic information data base 21.

Further, depending on the situation, voice message information may be stored in the graphic information data base in linkage, instead of it being included in the voice message annunciation information memory device.

Through the man-machine device 22 in FIG. 3, the operator selects (22a) a code of a device or parts of which operating procedure the operator wants to look at among the total functional element or the functional element concerned. The graphic information compilation processor 31 in the processing unit 21 reads the three-dimensional procedure information which shows the handling procedure of the device or parts corresponding to the selection code from the graphic information data base 28 in accordance with the selection code 22a. In the following description, the functional element refers to a device or a machine and the monoelement refers to the parts of the device or the machine. The type of the three-dimensional procedure information showing the handling procedure may be the one which enables three-dimensional graphic display or dynamic graphic display. In the present embodiment, the three-dimensional procedure information shows the case where the coordinates of parts and their directions are stored as a function of time and graphic display information (graphic image data) is generated around their reference points.

Figures 4A, 4B, 5:
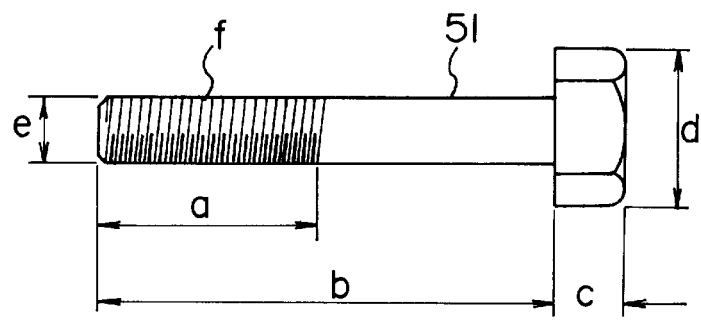
FIGS. 4A and 4B are information tables of parts or basic parts.
FIG. 5 shows an example of size information of basic parts.

FIGS. 4A and 4B show types of an information table within the graphic data base 28. There are broadly two types of table; one is a reference part information table 41 shown in FIG. 4A and the other is a device information table 42 shown in FIG. 4B. A device (or part) code 42a corresponds to each device or part, such as C00001 in FIG. 4B. The part information table 42 and the reference part information table 41 are stored correspondingly to each device or part code. The reference part information table 41 is provided to reduce the quantity of three-dimensional graphic information of elements which form device or part. For the parts having the same shape, three-dimensional graphic information of a reference shape is separately stored in the mono-element graphic information memory device 25. The mono-element graphic information memory device 25 is not necessary if the quantity of graphic information is not too large to be reduced, and in this case, the three-dimensional graphic information may be stored directly in the graphic information data base. Only characteristic lengths which represent the characteristics of the reference shape are stored in the reference part information table 41 within the graphic information data base 28. For example, in the case of a bolt, its characteristic lengths are deciced by six parameters which include a screw cut length a, a bolt length b, a bolt head height c, a bolt head diameter d, a bolt diameter e and a bolt screw pitch f, as shown in FIG. 5. (To be strict, there are some more parameters. However, they may be disregarded if they have little difference as an image in the three-dimensional graphics of the operating procedure.) For example, size information 42c of a part code B0000141a in the reference part information table 41 in FIG. 4A is expressed as follows:

$$S_{Bf} = (a, b, c, d, e, f) \quad (1)$$

As described with reference to FIG. 6 below, three-dimensional graphic information 64 of a reference part code A0000162 corresponding to a standard type of a part code B00001 is stored in the form of a reference part graphic information table 61 in the mono-element graphic information memory device 25. A reference size 63 of the three-dimensional graphic information 64 is expressed as follows:

$$S_{Af} = (as, bs, cs, ds, es, fs) \quad (2)$$

This reference size 63 is transferred to the graphic information compilation processor 31 as the three-dimensional graphic information 30a which is a result of scale transformation from $S_{Bl}$ to $S_{Al}$ by the scale transformation processor 30.

The part information table 42 stores the three-dimensional procedure information which shows the handling procedure of the device or the part of a device code C00001. It is assumed that there is only one element which includes a reference point of the device or the part among structural parts of the device code C00001. It is also assumed that a reference point of a part is defined in each part. Procedure coordinates 42c in the part information table shows relative coordinates $X_{Bl}$ (in the case of the part code B00001) between a reference point of the device or the part and a reference point as a part. The relative coordinates $X_{Bl}$ is expressed as a vector value function of an operating procedure mode Mode and time t as follows:

$$X_{B1} = X_{B1} \text{ (Mode; t)} =$$
$$= (x \text{ (Mode; t)}, y \text{ (Mode; t)},$$
$$z \text{ (Mode; t)}) \quad .... (3)$$

As the function of time t, $X_{Bl}$ expresses a locus of a reference point of a prt for dynamic graphics showing the operating procedure. The operating procedure mode Mode is a variable for discriminating different operation. For example, it is defined such that Mode=0 represents a disassembling procedure, Mode=1 represents an assembling procedure, Mode=2 represents an departing procedure, Mode=3 represents an inspection emergency procedure, and Mode=4 represents a repair procedure.

As another mode, a techncial level of the operator may be added to the order of ten, such as 0, 1 and 2 which represent a high-class level, a middle class level and an elementary class level, respectively, so that the operating procedure information can be displayed in accordance with the request of the operator.

A procedure rotation 42d in the part information table shows in Euler's angle $\theta_{Bl}$ a degree of positional deviation of a reference direction $n_{Bl}$ of each part from a reference direction ns of the device or the part. Similarly to the relative coordinates $X_{Bl}$, the Euler's angle $\theta_{Bl}$ is a function of the operating procedure mode Mode and time t, which is expressed as follows:

$$\theta_{B1} = \theta_{B1} \text{ (Mode; t)}$$
$$= (\theta a \text{ (Mode; t)}, \theta b \text{ (Mode; t)},$$
$$\theta c \text{ (Mode; t)}) \quad .... (4)$$

As the function of time t, $\theta_{Bl}$ shows time development of the Euler's angle of the part for dynamic graphics which shows the operating procedure. The operating procedure mode Mode is similar to the procedure coordinates. For the device or the part which is one level above the parts in hierarchy, procedure coordinates $X_{Cl}$ and a procedure rotation $\theta_{Cl}$ for the device code 42a C00001 are defined as three-dimensional procedure information. It should be noted that the three-dimensional procedure information of the device or the part is different between the case when this information shows the operating procedure of the device code C00001 itself and the case when this information shows the operating procedure of the device or the machine which is one level above.

The timing function $T_{Bl}$ in the part information table will be explained next. The timing function plays the role of a trigger signal for carrying out voice message annunciation and character display in synchronism with the display of three-dimensional graphic information which has been exploded from the three-dimensional procedure information that shows the handling procedure and the three-dimensional graphic information.

The timing processor 29 stores the timing function which has been transmitted in advance from the graphic information data base 28 by 31a through the graphic information compilation processor 31, and generates a pulse signal based on the timing function. The time t which is an argument of the timing function is held in accordance with a delay time 31c which follows the compilation processing of the graphic information that is separately transmitted from the graphic information compilation processor. The delay time 31c passes following the compilation processing of the graphic information and the time of the argument of the timing function passes, so that a pulse trigger is transmitted as read signals 29a and 29b to the voice message annunciation information memory device 26 and the character information file 27 respectively. As a result, one unit 26a of the voice message annunciation information is transferred to the voice message annunciation device 23 and one unit 27a of the character information is transferred to the graphic information compilation processor 31.

FIG. 6 shows one example of the reference part graphic information table 61 which is stored in the mono-element graphic information memory device 25. The reference part information table comprises the reference part code 62, the reference size $S_{AI}$63 and the three-dimensional graphic information $G_{AI}$64. The reference size $S_{AI}$63 is a vector comprising parameters (reference values) which characterize the shape as described above. The three-dimensional graphic information $G_{AI}$64 is a data group relating to the shape (standard). The reference part information table corresponding to the structural parts is transferred (25a) to the scale transformation processor 30 at the same time when the part information table 31 structuring the device or the part extracted from the graphic information data base 28 in FIG. 3 is read (28a) by 31a. Then, three-dimensional graphic information which is a result of a scale transformation $S_{BI}/S_{AI}$=(a/as, b/bs, . . . , f/fs) is transferred to the graphic information compilation processor (30a).

FIG. 7 shows one example of the voice message annunciation information table 71 which is stored in the voice message annunciation information memory device. The voice message annunciation information table comprises a device code 72, a handling procedure mode Mode 73, voice message annunciation information 75 corresponding to the mode and a voice message annunciation sequence 74. One unit of each voice message annunciation information is transferred (26a) to the voice message annunciation device 23 in accordance with the mode of the information table and the corresponding sequence each time the read signal (trigger signal) (29a) is inputted to the voice message anunciation information memory device 26.

FIG. 8 shows one example of the character information data table 81 in the character information file. The character information data table 81 comprises a device code 82, a handling procedure mode 83, a character display sequence 84, character display reference coordinates 85 and character information 86. 82, 83 and 84 are the same as the corresponding reference items in the voice message annunciation information table. Depending on the situation, for a particular part in dynamic graphics, it is necessary to synchronize the character display with space as well as with time.

For the character display reference coordinates 85, the reference coordinates function $B_0$ is used as a function of time t, and character display is made so as not to superpose on three-dimensional graphic display of parts.

The voice message annunciation device 23 is realized by a tape recorder or a CD player.

An example of the graphic display of the display device 26 will be explained with reference to a part of an adjusting valve.

Figure 9:
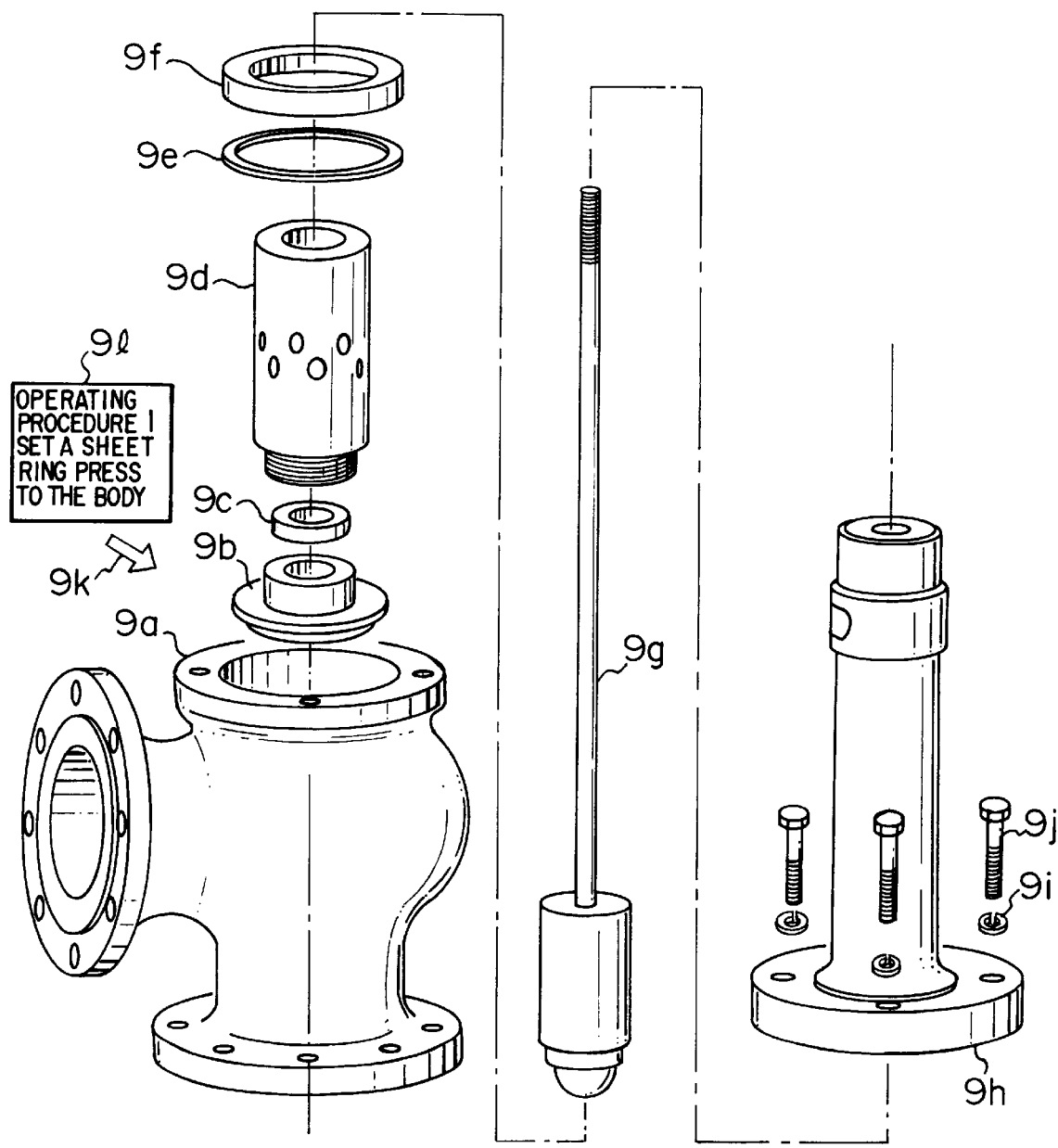
FIG. 9 shows an example of the display of a three-dimensional assembling of a device.

FIG. 9 shows an example of the three-dimensional graphic information display which illustrates the assembling procedure of the body portion of the adjusting value as an outline of the operating procedure of a certain total functional element.

It is assumed that the body portion of the adjusting valve comprises an adjusting valve body 9a, a sheet ring press 9b, a sheet ring 9c, a gauge 9d, a gasket 9e, a spacer 9f, a plug 9g, an upper lid 9h, a nut 9i and a bolt 9j.

Figure 10:
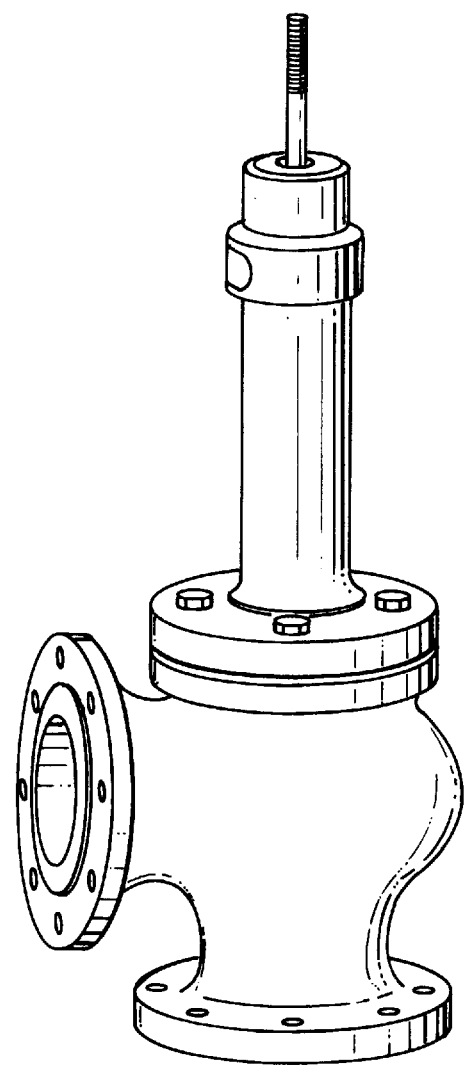
FIG. 10 shows an example of a completed assembly of the parts shown in FIG. 9.

In this example, the above structural parts are disposed in advance independently in accordance with the operating sequence based on the reference center line of the system or the like. The operating procedure is displayed in graphic dynamics starting from the part 9b as indicated by an arrow 9k in FIG. 9 so that the parts are sequentially assembled into the valve body 9a, resulting in a complete assembly as shown in FIG. 10. In this case, a character display area encircled by a center portion 9l is outputted to make a display of the content of the procedure and caution items. A method employed in the present embodiment to make a dynamic graphic display is that three-dimensional graphics of each part is generated around a certain reference point and a move display is made with the reference point used as a function of time or a natural number (sequence number).

Figure 11:
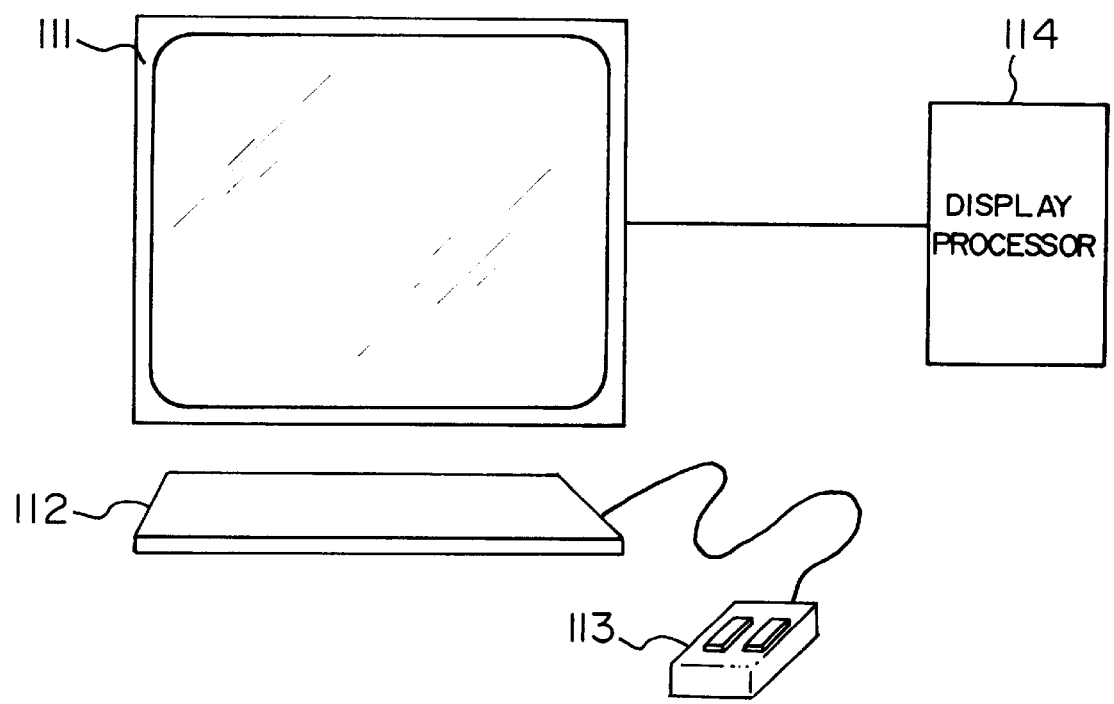
FIG. 11 shows an example of a display unit and a man-machine device.

FIG. 11 shows a display device and a man-machine device. Three-dimensional dynamic graphic information outputted from a display processor 114 comprises a display key 111, a keyboard 112 and a mouse key 113 of an engineering work station level.

Figure 12:
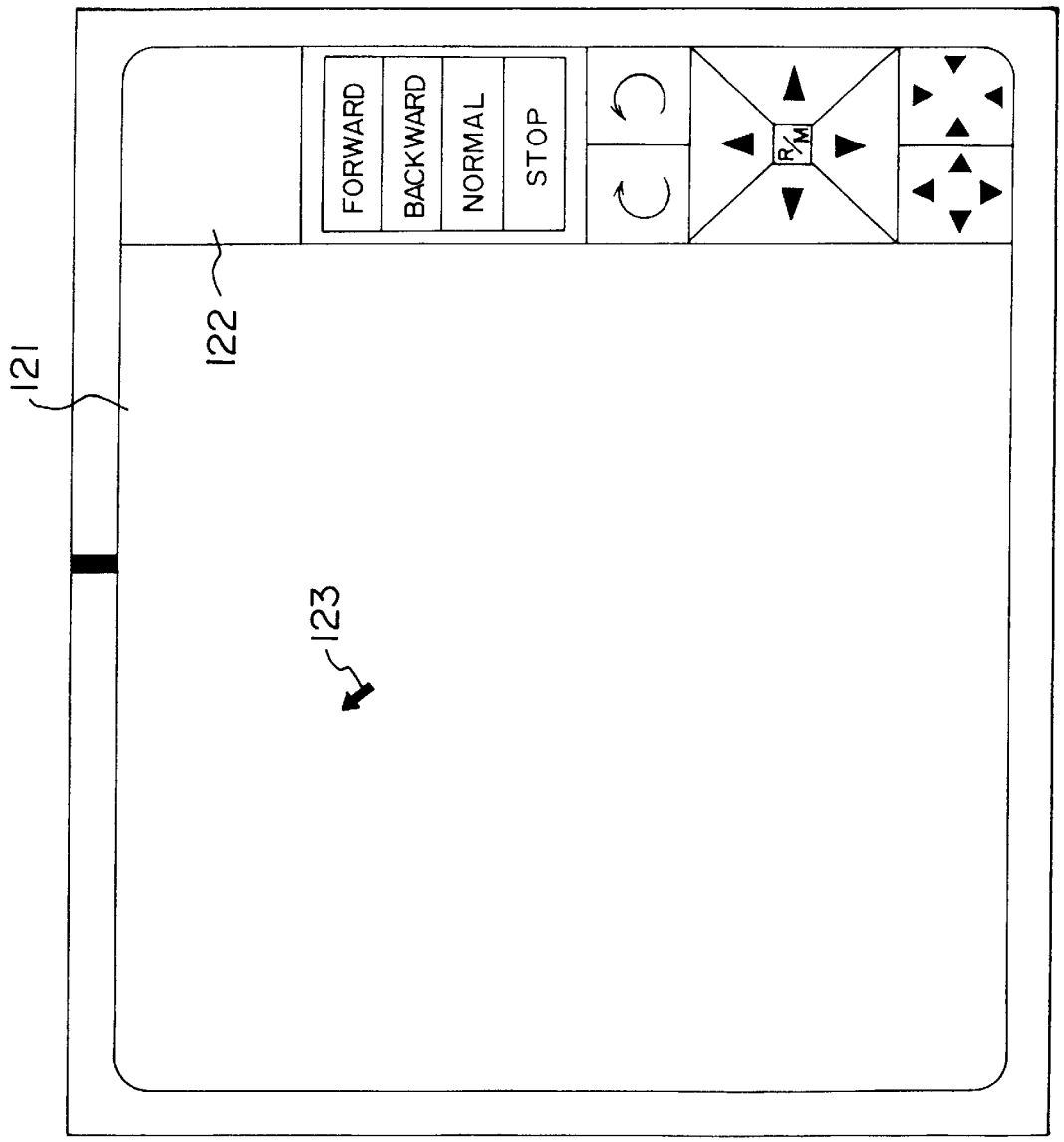
FIG. 12 shows an example of the display scene of the display.

FIG. 12 shows the configuration of the display screen of the display 111 in FIG. 11. The screen comprises a dynamic display portion 121 and an indication key structure portion 122.

The pointer 123 is common to the man-machine device and the display device which use the mouse key, and has a position indication function for indicating a position on the screen with the mouse key and for transmitting a signal corresponding to the position on the screen.

In the present embodiment, a dynamic graphic program corresponds to a function for generating detailed graphic information from the time function of coordinates or the like.

There are various variations in the graphic information for showing the handling procedure. For example, there are following functions of:

a) displaying a device (or tool) to be used;
b) flickering the lamp for a part to be operated next as dynamic graphics;
c) displaying an arrow to a part to be operated next as dynamic graphics;
d) displaying necessary parts one by one on the screen instead of displaying all the parts along the center line as shown in FIG. 9; displaying a part list which shows a list of devices or parts; and adding color to those devices or parts which have contributed to the assembly;
e) making a level display to parts for the standard of the parts (follow-up synchronization of a character display);
f) for the standard of parts, moving the pointer to a targeted part and picks it up so that an information column of the part is opened;
g) stopping, quickly feeding and rewinding a dynamic graphic screen display although the content of the display is unchanged;
h) selecting a position of the light source; and moving a virtual light source to a desired position when it is desired to watch the details of the shadow portion of the graphic image;
i) displaying a screen from any desired viewpoint by stopping the dynamic graphics;
j) displaying a desired cross section by stopping the dynamic graphics; and
k) making a partially expanded display of the three-dimensional graphics of the functional element or the total functional element.

Referring back to FIG. 3, signals of each device or between the processing portion will be explained. In the above description, the following four functions implicitly assume the analog function with respect to time so that a troublesome processing is involved in their synchronization processing: the relative coordinates in the part information table in FIG. 4

$$X_{BI}=X_{BI}(\text{Mode}; t) \qquad \text{the above expression (3)}$$

and, the Euelr's angle $$\theta_{BI}=\theta_{BI}(\text{Mode}; t) \qquad \text{the above expression (4)}$$

or, the timing function $$T_{Bf} = T_{B2}(\text{Mode}; t) \tag{5}$$

and, character display reference coordinates in the character information table in FIG. 8.

$$B_{01} = B_{01}(t) \tag{6}$$

Therefore, in the following description, it is assumed that the graphic information has been digitized in advance with respect to the time direction and the above four functions are handled as digital functions for which only one value is decided corresponding to a natural number. In this case, 31b in FIG. 3 designates the device code C00001 and the selected operation procedure mode. As described later, the timing processor 29 has only a role of a selector for deciding whether the voice message annunciation information indication code which is indicated by the device code and the operating procedure mode, the originating source of the character information code and the trigger signal are for the voice message annunciation information or for the character information.

Figure 13:
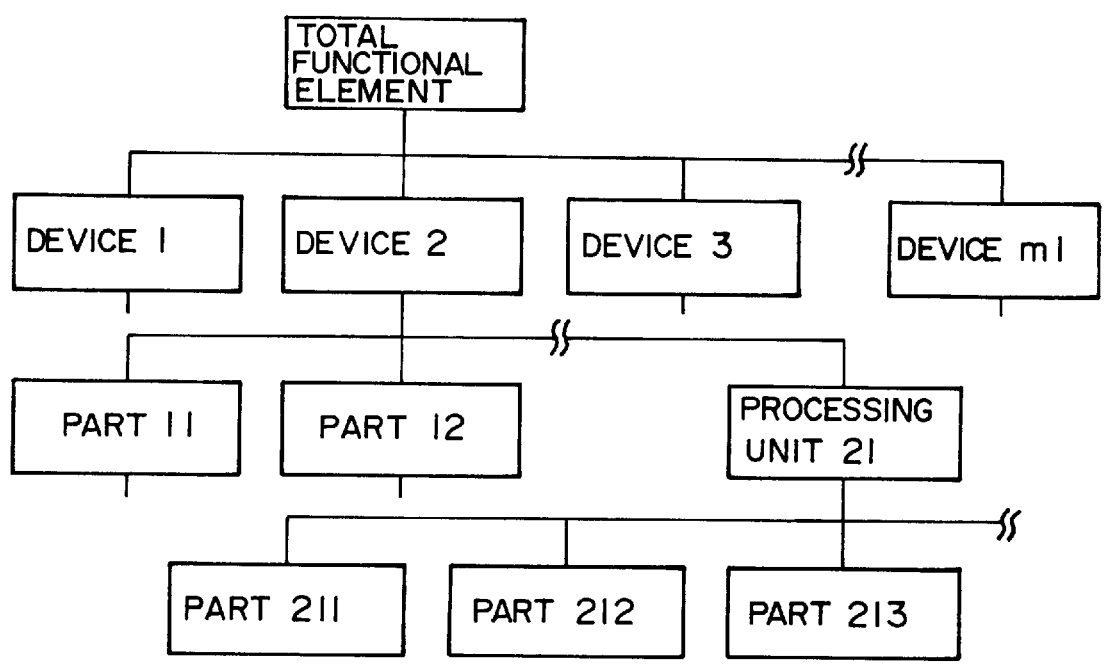
FIG. 13 is a diagram for explaining the hierarchical structure of a device or parts.

Signals in FIG. 3 will be explained below. The operator first selects the operating procedure of either the devices, machines or parts for the machines which structure the total functional element (such as a plant). The total functional element can be exploded into the hierarchical structure including low order structural components as shown in FIG. 13. Although not shown in FIG. 3, such a hierarchical structure as shown in FIG. 13 is displayed in the display device 24 so that the operator can input the selection code 22a of a desired device or part based on the display. A graphic information read signal 31a is transmitted to the graphic information data base 28 so that the search within the data base is started. When required graphic information has been searched, graphic information 28b is transferred from the graphic information data base 28 to the graphic information compilation processor and is stored in the processor while an access is being made to the operating procedure information of the desired device or part. At the same time, a reference graphic information read signal 28a is transmitted from the graphic information data base to the mono-element graphic information memory device 25, so that the mono-element graphic information of an element (a single element) structuring the desired device or part is searched. The searched mono-element graphic information 25a is transmitted to the scale transformation processor 30 in the processing unit 21. Size information $S_{BI}$ in the part information table 42 in FIG. 4 has been transferred in advance from the graphic information data base 28 to the scale transformation processor 30. Therefore, the searched mono-element graphic information 25a is then transferred to the graphic information compilation processor 31 as three-dimensional graphic information 30a which is a result of scale transformation in comparison with the size information $S_{AI}$ in the mono-element graphic information 25. Immediately after that, generation of graphic image data is started and the counter works each time image data of one unit is generated. When the number of the definition area (integer) of the timing function (the value range is 0 or ±1) which is a digital function and the counted unit number coincide among the graphic information that is separately stored in the graphic information compilation processor 31, and when the value is either plus or minus one, a trigger signal 31c is transmitted to the timing processor 29, and is allocated to either a voice message annunciation read signal 29a of the voice message annunciation information memory device 26 or a character information read signal 29b of the character information file 27 depending on whether the value is plus or minus.

Figure 14:
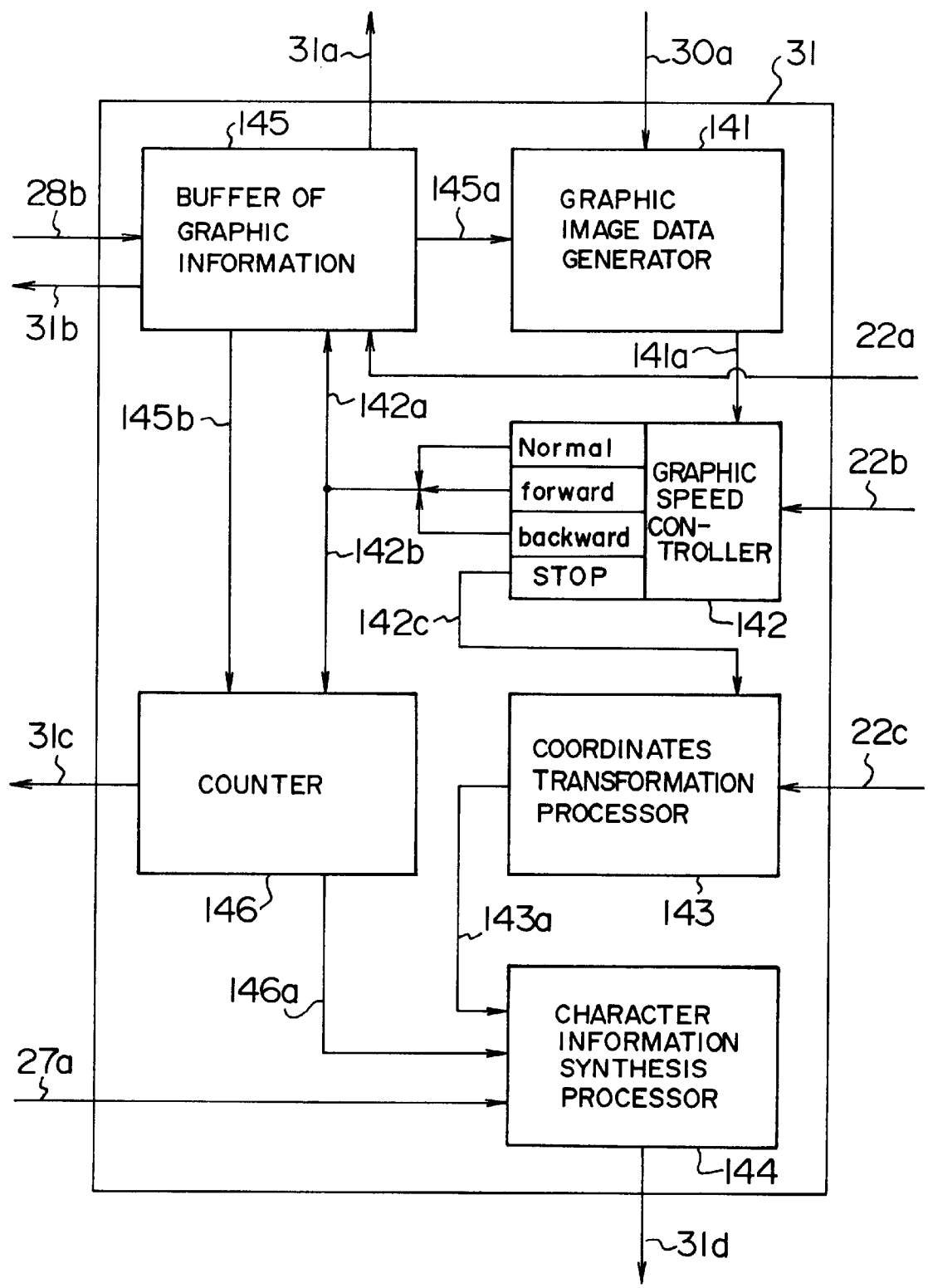
FIG. 14 shows an example of the structure within the graphic information edit processing unit.

When the voice message annunciation information read signal 29a as a trigger signal has been transmitted to the voice message annunciation information memory device 26, the pulse trigger signals 29a and 29b are sequentially inputted to the open stand-by state of the file channel of the device code and the operation procedure mode corresponding to the voice message annunciation information memory device 26 and the character information file 27 set in advance by the "device code and operation procedure mode" 31b through 29a and 29b. Therefore, each one unit of the voice message annunciation information 26a and the character information 27a is transmitted to either the voice message annunciation device 23 or the graphic information compilation processor 31. The character information 27a includes the character display reference coordinates $B_{01}$ for displaying the character. As described above, there are variations in the method of synchronizing processing depending on the type of three-dimensional procedure information and the processing method in the processing unit. A method which can take synchronization with the display graphics by a suitable timing is acceptable as the function. In FIG. 3, the signal 22b from the man-machine device 22 is a graphic speed control signal to the control unit of the display graphic speed, and 22c is a coordinates transformation command for giving desired reciprocal viewpoint coordinates to the three-dimensional graphics. FIG. 14 shows an example of the internal structure of the graphic information compilation processor 31, which comprises a graphic image data generator 141, a graphic speed controller 142, a coordinates transformation processor 143, a character information synthesis processor 144, a buffer of graphic information 145 and a counter 146. When the device code of the device or part which structures the total functional element desired by the operator and the operating procedure mode 22a are inputted from the man-machine device to the graphic image data generator 141, 22a goes to the graphic information data base 28 through the graphic information buffer 145, to read the desired graphic information.

The read graphic information 28b which includes the part code 42b, the procedure coordinates 42c, the procedure rotation 42d and the timing function 42e in the part information table in FIG. 4, is transferred again to the graphic information compilation processor 31 and is stored in the graphic information buffer 145. This is kept to be stored until the operator selects the separate device code. At the same time when 22a is entered in the graphic information buffer 145, the device code and the operating procedure mode 31b are trnasferred to the timing processor 29 so that the character information file 27 and the corresponding files are set open. Voice message annunciation information or character information is stored corresponding to a natural number in the opened files. Each time a trigger signal is applied, one piece of information is transmitted as 26a to the voice message annunciation device 23 and as the character information 27a to the three-dimensional procedure information buffer.

The graphic information 145a, or the procedure coordinates $X_{BI}$ and the procedure rotation $\theta_{BI}$, are sent from the three-dimensional procedure information buffer 145 to the graphic image data generator 141. The three-dimensional graphic information 30a which has been sent in advance from the mono-element graphic information memory device through the scale transformation processor is applied and stored in the graphic image generator. Each time the graphic information of a unit screen is inputted, graphic image data to be exploded on the display device is generated and is transferred to the graphic speed controller 142. As shown in FIG. 14, the graphic speed controller 142 has four graphic speed modes including normal, forward, backward and stop. The stop mode is the mode in which the graphic image data is stopped once so that the operator can change the viewpoint as desired. When the stop mode has been selected, the graphic image data is sent as 142c to the coordinates transformer 143 and the coordinates of the graphic image data is transformed in accordance with the input 22c of the viewpoint of the operator. The graphic image data is transferred to the character information synthesis processor as the graphic image data 143a after the transformation of the coordinates. This stop mode is effective because it makes it possible to look at the shade portion or the detailed structure in an expanded view when it is difficult to recognize the pattern of an image due to the image of a uniform operating procedure.

In the mode other than the stop mode, a gate signal 142a is transmitted from the graphic information controller 142 to the buffer of graphic information 145 so that the graphic information 145a is sent from the buffer 145 to the graphic image data generator 141. Graphic image data is transferred in advance from the buffer of graphic information 145 to the counter 146 and is held there so that the order of the unit of the image is counted. For the count number, the value of either 0 or plus or minus 1 is outputted by the timing function $T_{BI}$ (there are three values of 0 and ±1 as a definition area of a natural number (count)). This value is transmitted to the timing processor 29 as a trigger signal 31c. For example, it is set such that one unit of voice message annunciation information is outputted when the output value is +1 and one unit of character information is outputted when the output value is −1. The character information read by the trigger signal 31c is 27a which is synthesized with the graphic image data 146a at the mode other than the stop mode, by the character information synthesis processor 144, and is finally outputted to the display device 24 as the graphic display information 31d.

Figure 15:
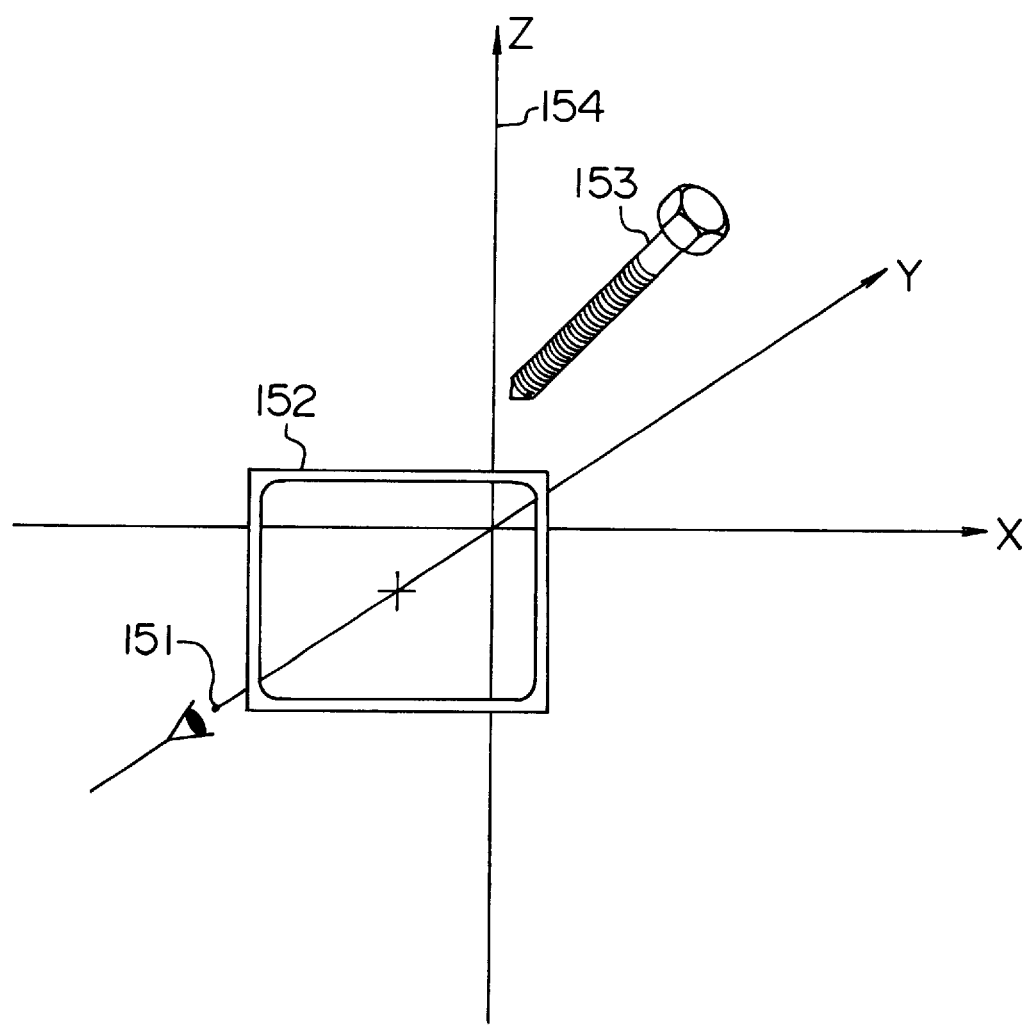
FIG. 15 is a schematic diagram of a three-dimensional graphic display function.

The reciprocal viewpoint coordinates information will be explained below with reference to simple three-dimensional graphic information (a bolt as an example). FIG. 15 is a schematic diagram of the display function of the three-dimensional graphics. 151 designates a virtual viewpoint (a viewpoint according to the calculation for generating three-dimensional dynamic graphics) of the operator, 152 designates a virtual screen (a screen according to the calculation for generating three-dimensional dynamic graphics) of the display device.

An object image 153 of the bolt is disposed in the space expressed by screen reference coordinates 154, and a scene controlle within the virtual screen 152 as viewed from the virtual viewpoint 151 is the scene outputted to the display device.

Figure 16:
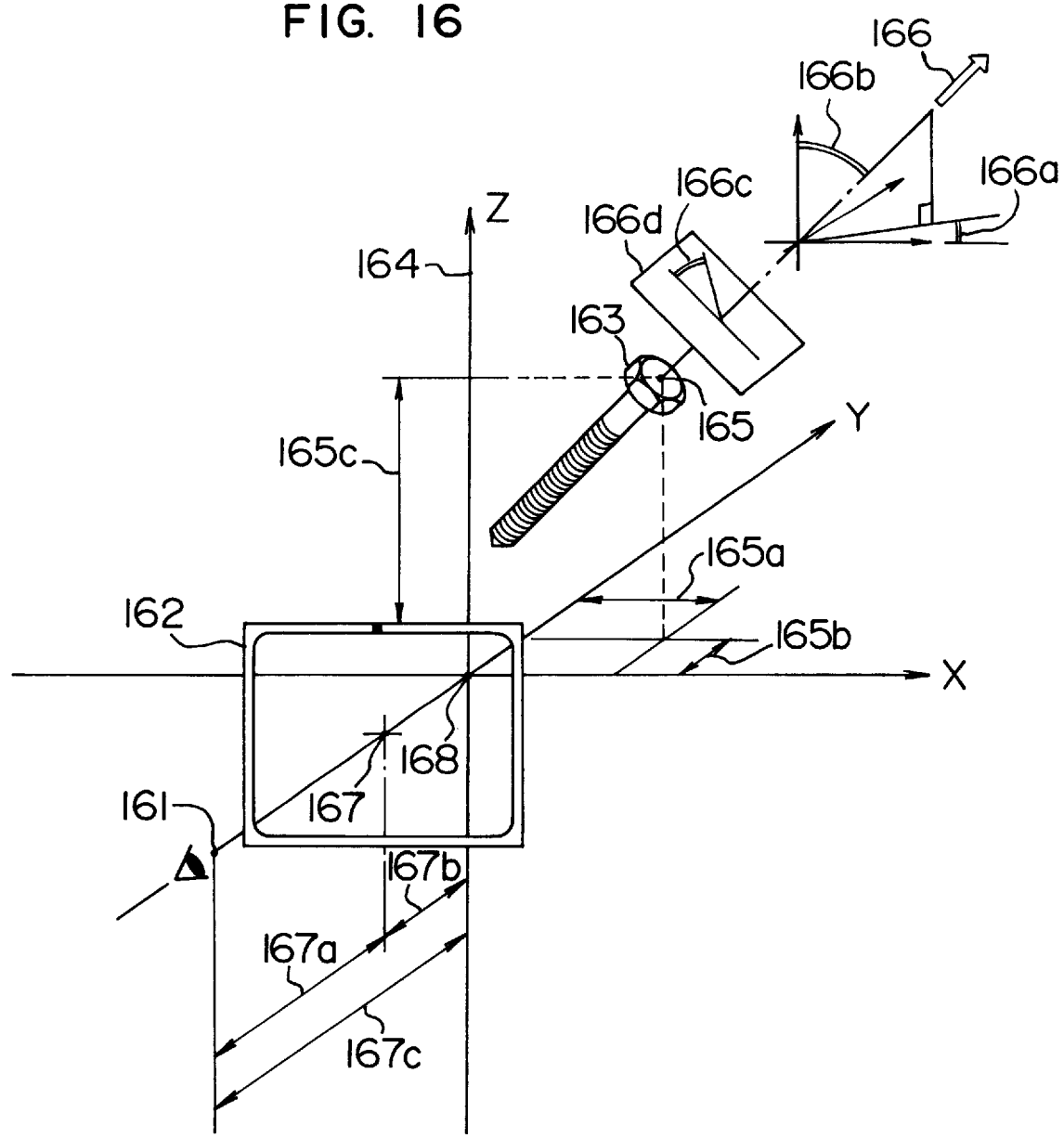
FIG. 16 is a schematic diagram of an object graphic position assigning function.

FIG. 16 shows the indication of the coordinates and the direction of object graphics 163 of the bolt and expansion/compression means for forming three-dimensional dynamic graphics. A position of the bolt 163 is indicated by the coordinates of a reference point 165 of the bolt and a direction of the bolt 163 is indicated by angles 166a and 166b which show the direction of a vector 166 of the reference direction of the bolt and a rotation angle 166c. The coordinates of the reference point 165 of the bolt is expressed as follows by the X coordinate 165a, y coordinate 165b and z coordinate 165c;

$X = (x, y, z)$

The directions 166a and 166b and the rotation angle 166c are expressed as follows:

$\theta = (\theta a, \theta b, \theta c).$

Expansion and compression can be obtained by changing a distance 167a between a center point 167 of the screen and a virtual viewpoint 161 for a distance 167b between the center point 167 of the screen and an origin 168 of the space.

Figure 17:
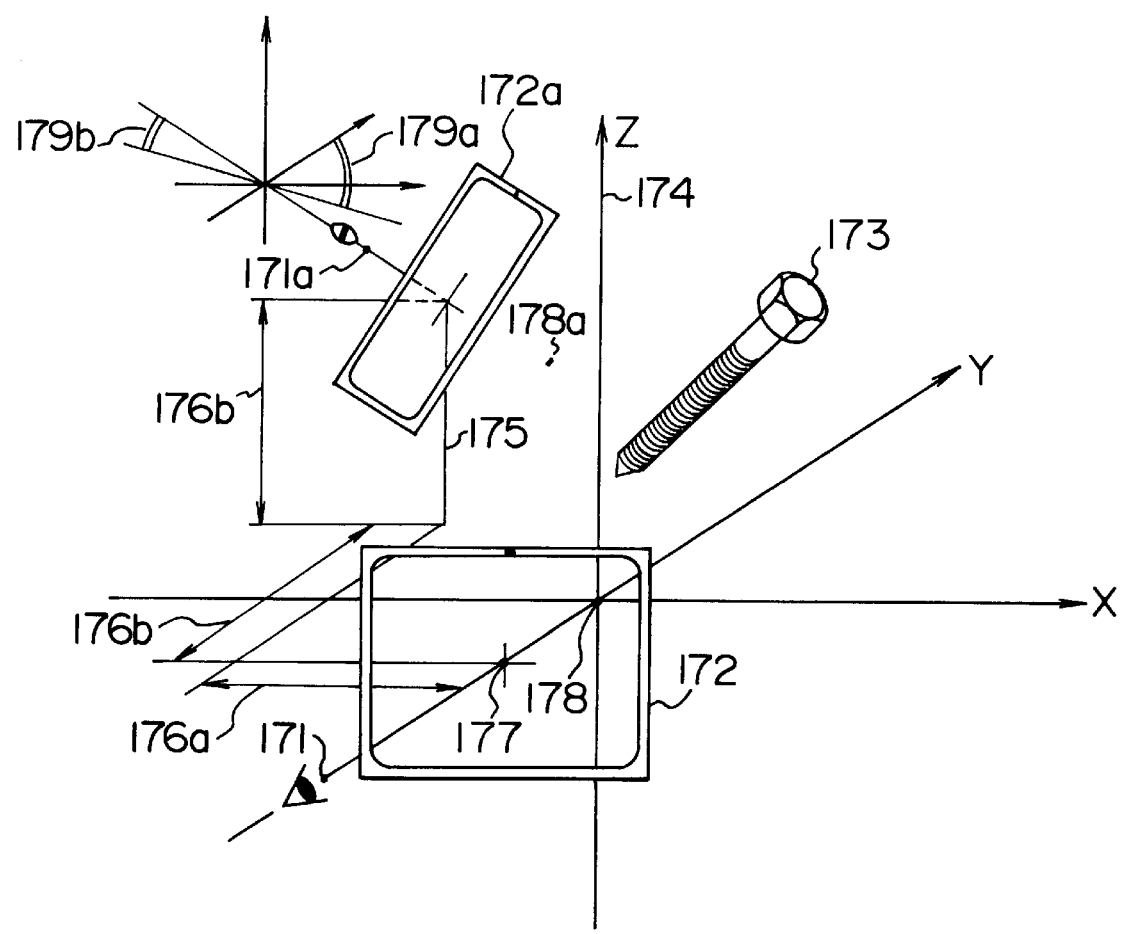
FIG. 17 is a schematic diagram of a reciprocal view point coordinates information generation function.

FIG. 17 is a diagram for explaining the function which enables a generation of coordinates information of a desired reciprocal viewpoint. In order to realize graphics as viewed from a desired viewpoint, a virtual viewpoint 171 and a virtual screen 172 are moved/rotated so as to set the object graphics at a desired position and in a desired direction while maintaining the relative distance between the virtual viewpoint 171 and the center point 177 of the virtual screen 172. The center point 177 of the screen moves along the locus 175 of the center point 177, that is (x, o, o) 176a, (o, y, o) 176b, (o, o, z) 176c and reaches the point 177a. In order to adjust the relative direction, graphics of a desired direction can be obtained by the rotation 179a and the rotation 179b along the axis which passes through the viewpoint 171a after the movement and the center point 177a of the virtual screen while fixing the center point 177a of the virtual screen. Although not shown in FIG. 17, the rotation around the normal axis of the virtual screen is also one of degrees of freedom.

Although the locus 175 of the center point of the screen in FIG. 17 is linear, a curve movement is practical. Although the functions of the reciprocal viewpoint are shown schematically in FIGS. 15 to 17, these functions are processed as a software which can be easily structured.

Figure 18:
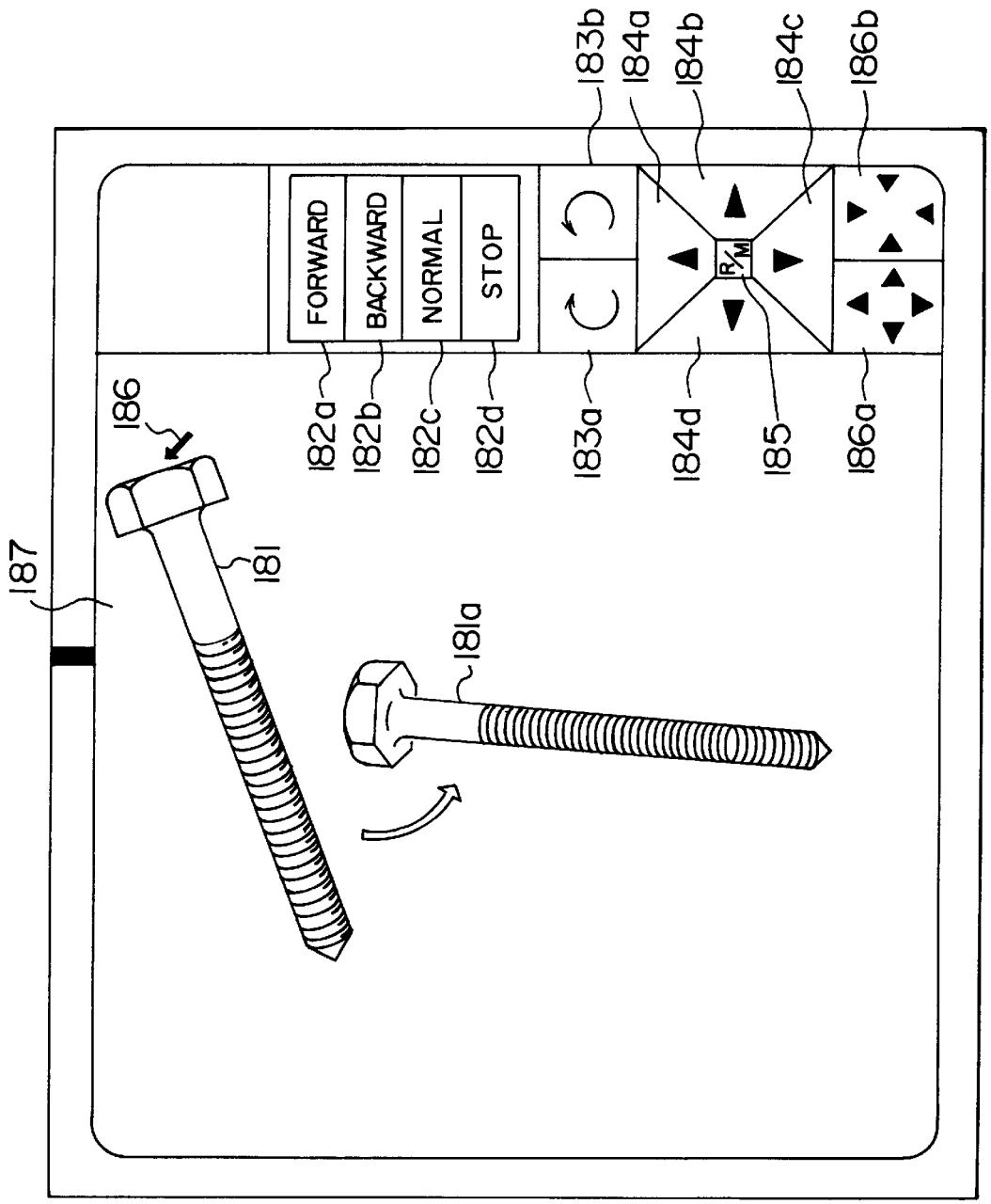
FIG. 18 shows an example of a graphic display according to reciprocal viewpoint coordinates.

FIG. 18 shows an example of the screen display of an object image of the bolt when coordinate information of the reciprocal viewpoint for explaining the function in FIGS. 15 to 17 is used. Although FIG. 18 shows a simple example of the bolt, it is possible to provide an image from an optimum angle in order to transmit the operating procedure to the operator by displaying the operating procedure as a three-dimensional dynamic scene of the operating procedure. In the case where the operator can have a better understanding of the operating procedure when it is transmitted to the operator from a plurality of angles, the scene may be set in a free format so that the operator can watch the image of the object from a desired viewpoint in a desired operating process. In FIG. 18, a bolt 181 is an image of the bolt 173 viewed from the viewpoint 171 in FIG. 17, and a bolt 181a is an image of the bolt 173 viewed from the viewpoint 171a in FIG. 17. Description will now be made of an embodiment of the procedure for the operator to obtain the bolt 181a in FIG. 18 from the bolt 181 in FIG. 18 as the display image of the bolt 173 in FIG. 17 when a free format is introduced. When the operating procedure is shown in a normal fixed format, an indication key 182c of the screen is selected. Depending on the technical level of the operator, it is possible to omit or repeat the dynamic scene of the information of the operating procedure by forwarding or backwarding the scene. The forwarding and backwarding are functioned by selecting an indication key 182a and an indication key 182b in FIG. 18 respectively. Since these functions are processed as a software, a mechanical response time is extremely reduced unlike a video tape recorder. When an indication key 182d in FIG. 18 is selected, the scene is fixed and a display of the coordinates of a desired reciprocal viewpoint based on this scene becomes possible. The move of the virtual viewpoints 176a, 176b and 176c in FIG. 17 is achieved by sequentially selecting the move of a vertical or lateral direction of direction indications 184a to 184d or a positive or negative direction of rotations 179a and 179b of a virtual scene 172a in FIG. 17. A selection key 185 is used to select the direction indication of a move or the direction indication of a rotation. Indication keys 186a and 186b in FIG. 18 are used respectively to expand or compress the image of an object by adjusting a virtual viewpoint 167a in FIG. 16. Indication keys 183a and 183b in FIG. 18 show directions of a rotation around the axis of the center point of the virtual viewpoint and the virtual scene. While the indication keys of move and rotation are manipulated by the mouse key, the object image on the screen changes at a constant speed of change.

The above explains the move of a virtual viewpoint of a bolt which is an object image in FIG. 15. It is easy to operate when there is only one image of an object to be handled. When a plurality of images of objects before the assembling are distributed in the space, it is easy to operate by assigning a part of a target disposition of the group of products. Since the degree of freedom of the virtual viewpoint and the degree of freedom of the object image are 6 respectively, only a unit is required which can assign the move/rotation of the virtual viewpoint or the move/rotation of the object image itself. For example, when the pointer 186 on the screen in FIG. 18 is used to pick up the object image 181 or to pick up a background 187, the group of the indication keys in FIG. 18 can be used to operate the move/rotation of the object image or the move/rotation of the virtual viewpoint, respectively.

Figure 19:
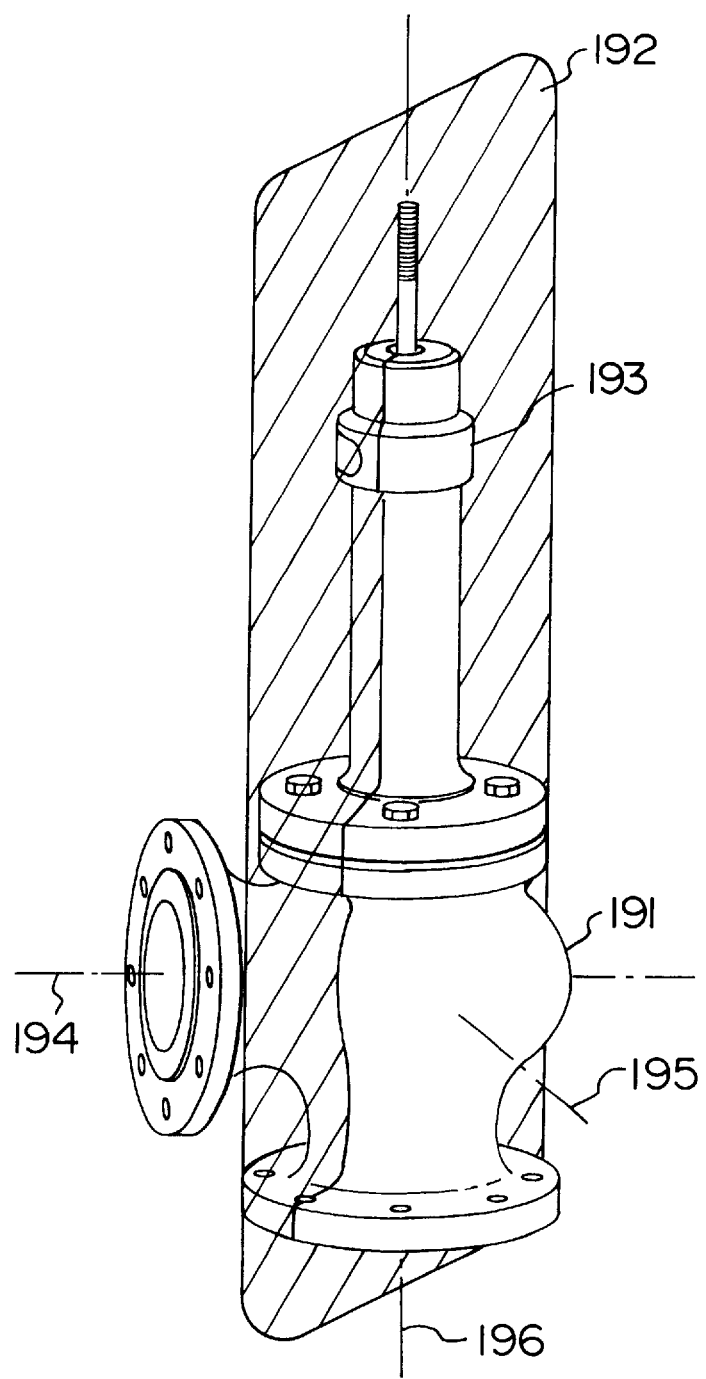
FIG. 19 shows an example of a cross-sectional display.
Figure 20:
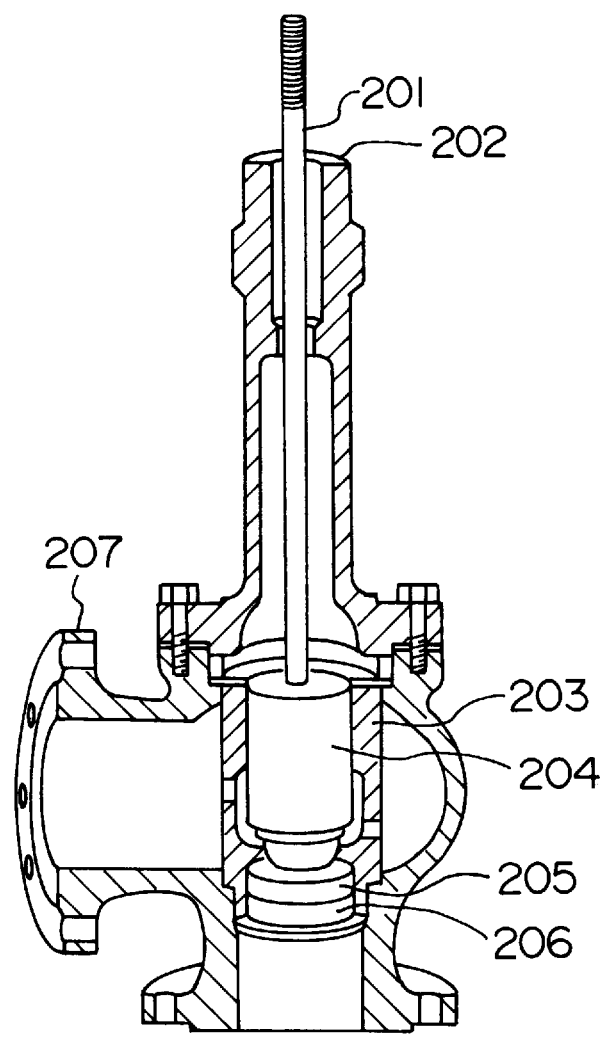
FIG. 20 shows an example of a display of a cross-sectional projection.

The following is considered as another access to graphic image data by the operator. It is not possible to understand the relationship between parts after the assembly or the relationship between the devices or parts, by having a direct look at a three-dimensional graphic scene. As a new function of a coordinates transformation section, a two-dimensional projection of a sectional surface can be considered. An example of a detailed display is shown in FIG. 19. A sectional surface 192 is displayed for a graphic image 191 of the adjusting valve. The sectional surface 192 can be set in a desired direction for reference lines 194, 195 and 196. In accordance with the request of the operator, the graphic image of the right half or the left half can be deleted to offer a cross section. FIG. 20 shows an example of a sectional view which illustrates a sectional surface cut along the reference lines 194 and 196. In this case, it is possible to select a display image which does not show cross sections of a plug portion 204, a sheet ring press 205 and a sheet ring 206.

Figure 21:
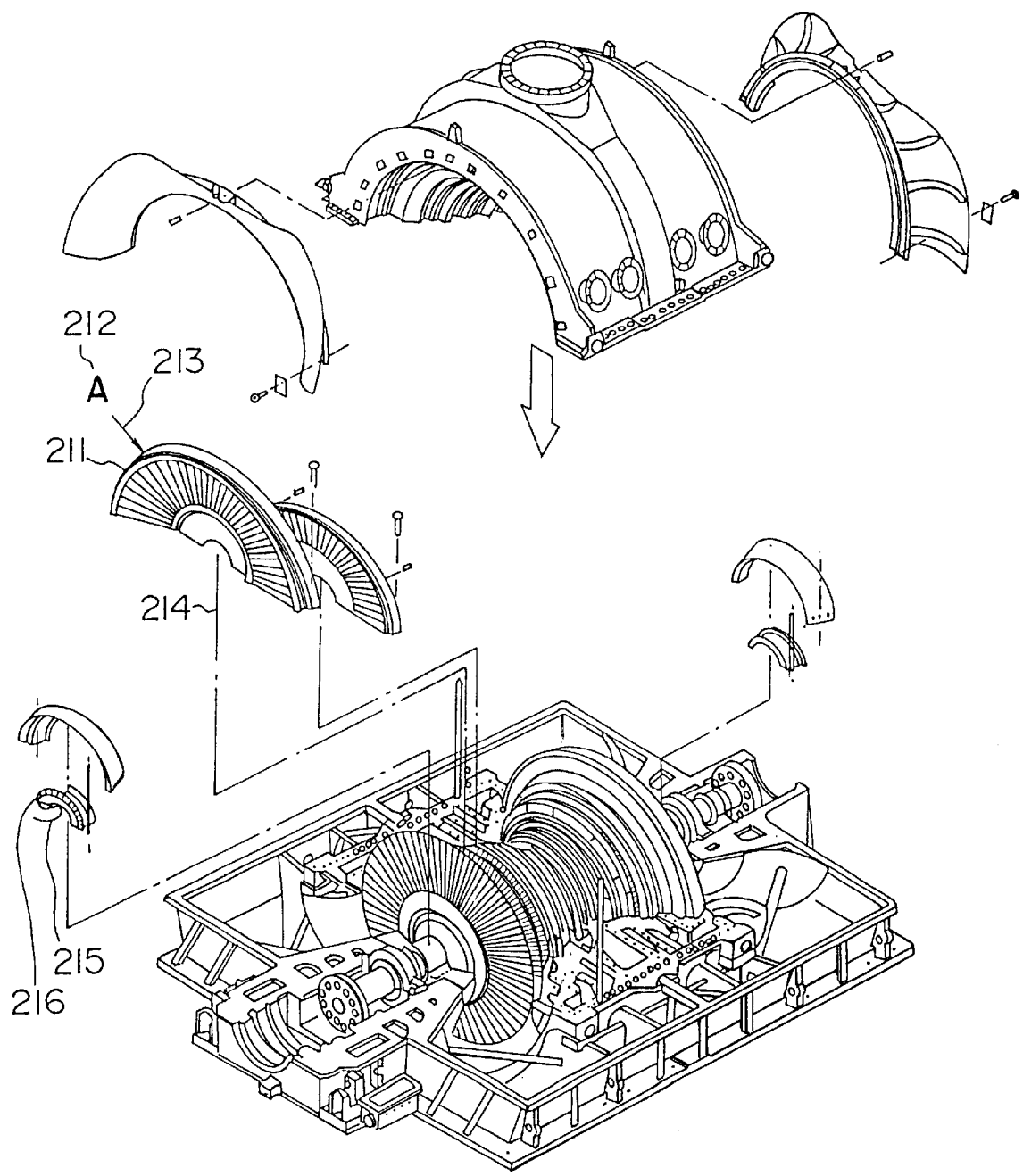
FIG. 21 shows an example of a screen display of a low-tension turbine casing.
Figure 22:
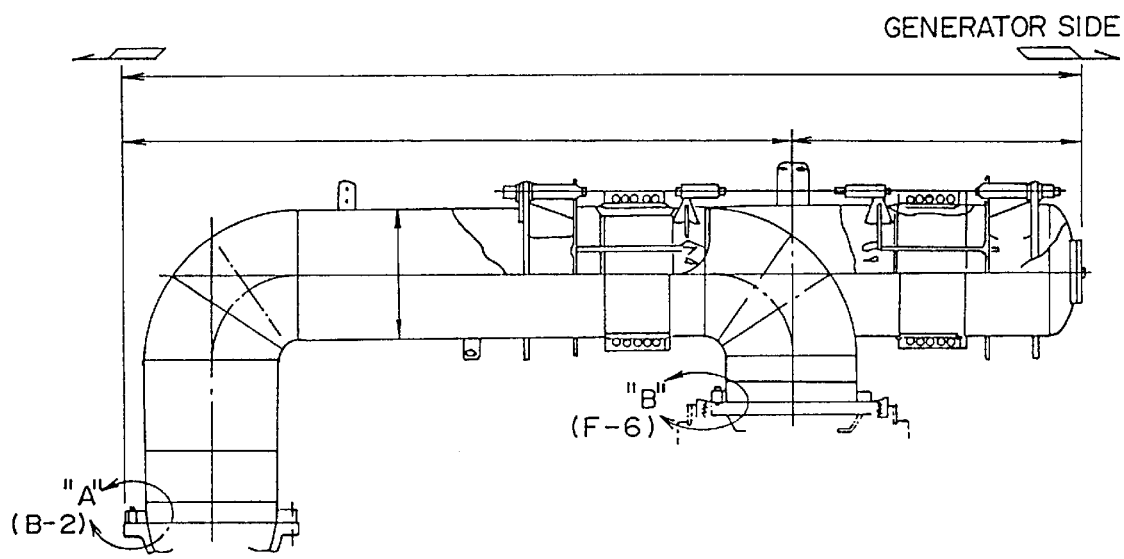
FIG. 22 is a projection diagram of a crossover pipe lateral cross section.
Figure 23:
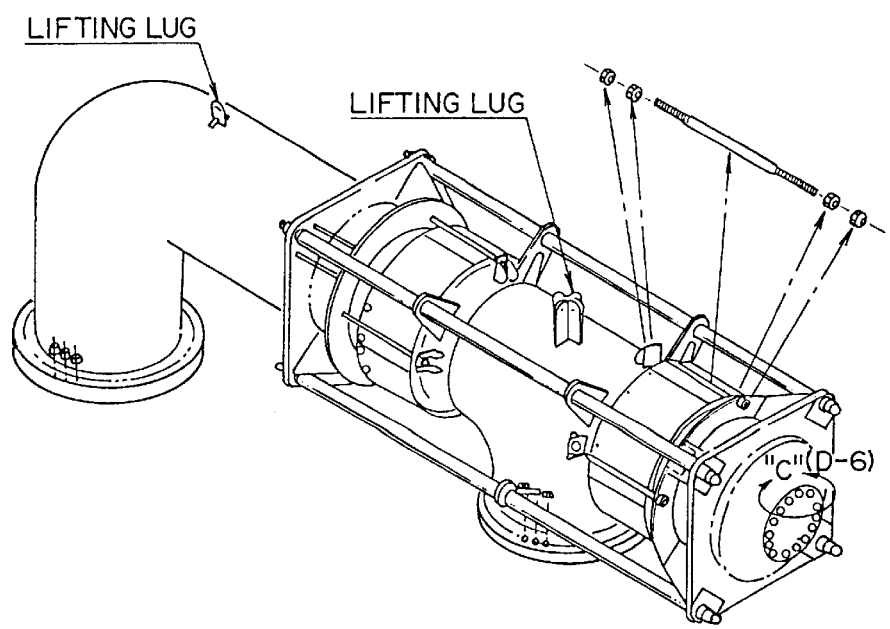
FIG. 23 shows an example of three-dimensional graphics of a cross-over pipe.

FIG. 21 shows an example of graphic display of the assembly operating procedure of the upper casing of the low-tension turbine, as an example of large functional elements. In FIG. 21, a diaphragm 211, for example, is corresponded to a character 212 by an arrow 213. The low-order information of the diaphragm 211 is newly displayed graphically by picking up the character 212. An assembly indication reference line 24 is a line which shows the position where a mono-element structuring the functional elements or low-order functional elements are built in. The assembly indication reference line 214 is effective in displaying the exploded view of complex machine elements.

Although the above embodiments describe only a three-dimensional graphic display, a two-dimensional display is also sufficient for certain functions or total functional elements such as a system structure or a switchboard. In this case, two-dimensional graphic information is displayed by setting to zero the Z component of three-dimensional graphic information $G_{AI}$ which is stored in the graphic information table of the reference parts 61 in FIG. 6, so that a display unit or method for a similar operating procedure excluding the conditions of a three-dimensional display can be realized.

The concept of the "display unit or method for an operating procedure" has been described above. An actual display unit for an operating procedure must be rich in functioning and operationability. The man-machine interface processing function which is performed by the graphic information compilation processor 31 in FIG. 3 will be explained below.

Request conditions common to the free format/fix format and the request functions and its embodiment will be described first, and the request functions for each format and their embodiments will be described later.

1) Quick Selection of a Desired Portion

The operator needs to reach promptly and accurately the display graphics/dynamic display which shows a desired functional element or an operating procedure of a desired part.

The total functional element has a hierarchical structure as shown in FIG. 13. A representative terminal is a work station having a mouse key as shown in FIG. 11. It is possible to have a software which displays a tree diagram as shown in FIG. 13 at a part of the screen and reaches an initial scene showing the respective operating procedures by picking up a sheet that displays a desired functional element or part. In this case, it is possible to select an operating procedure flow which matches the technical level of the operator when a flow diagram of a detailed operating procedure display is defined as an attribute of the sheet and the operator selects a desired operating procedure flow. Alternatively, there is a method that, instead of drawing an independent tree diagram on the screen, the operator directly picks up with the mouse key the graphic display portion of each functional element/ part which is a structure element of the total functional element, so that the operator can move to the next hierarchy of the functional element/part.

2) Quick Recognition of Parts

In some occasions, the operator must promptly recognize positional relationships, functions and names of functional elements structuring the total functional element, parts and elements. It is not difficult to build a software which displays character information of names and functions of attributes by picking up a part image on the screen, for example.

It is possible to easily understand the positional relationship by having an initial screen of the operating procedure which shows a standard broken diagram centered around many reference lines as shown in FIG. 9.

3) Clearly Shows what Should be Done Next

Figure 24:
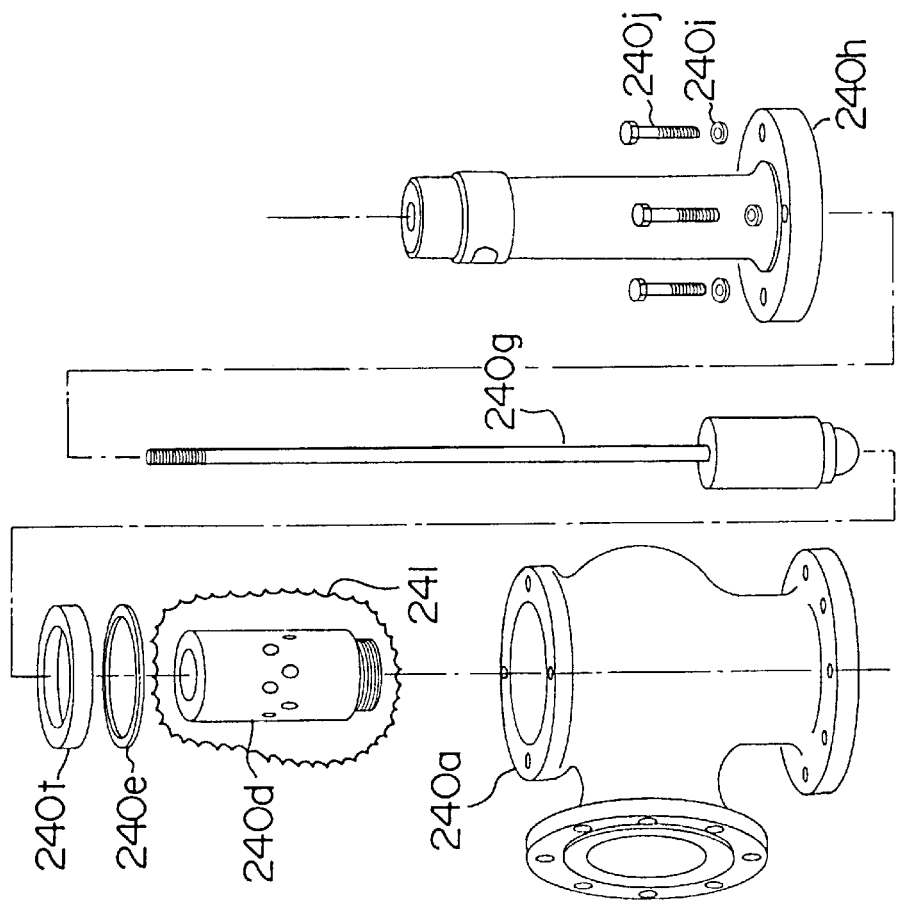
FIG. 24 shows an example of the display of emphasized graphics of parts to be operated.

When a graphic or dynamic graphic display of the operating procedure is made, coloring, flickering or arrowing is applied to structural parts such as functional elements, parts and elements which are currently being operated or are to be operated from now on, in order to clearly identify these as distinct from other structural elements, so that the operator is guided with clear impression about the next item to be operated. An example is shown in FIG. 24.

4) Graphic Display of Machines, Tools and Gauges when Necessary

Figure 25:
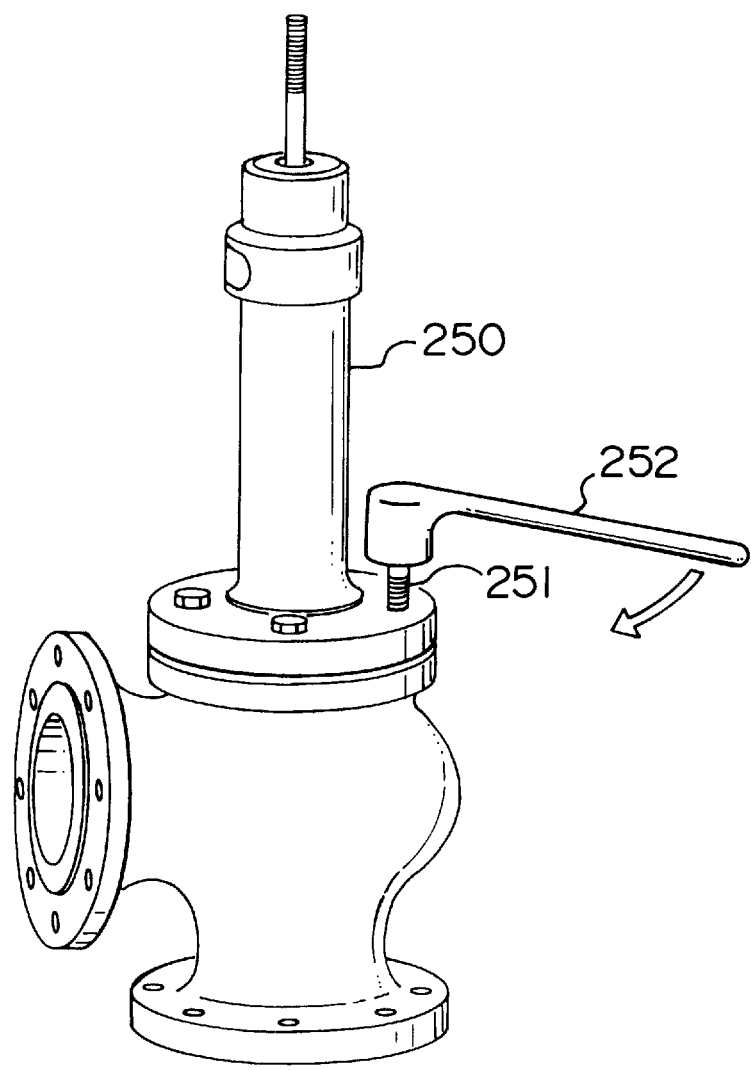
FIG. 25 shows an example of the display of tool operation.

Depending on the situation, the operator can understand better the operating procedure when graphic/dynamic graphic display is made of a machine, tool or gauge. For example, FIG. 25 shows an example of a box spanner 252 which illustrates the fastening operation of an upper-lid fitting bolt 251 for an adjusting valve 250.

5) Gives an Impression about the Operation to be Taken

Background necessary conditions for the operation are shown by character information or voice message annunciation information, or phenomena which may arise if the procedure is not taken is graphically displayed.

6) Move Between Free-format Graphics/dynamic Graphics and Fixed-format Graphics/Dynamic Graphics When the operator wants to look at the detailed structure of the functional elements during the courses of an operation, the operating state may move from the stop format to the free format. It is also possible to assign a move from the free format to the fixed format, that is a return to the graphics/dynamic graphics showing a standard operating procedure.

A fixed format of graphics/dynamic graphics is explained next.

1) Search for Display Graphics/Dynamic Graphics

In the case of a training (learning) manual, standard graphics/dynamic graphics are considered as a fixed format with their content unchanged. In this case, the functions of forwarding, backwarding and stop are necessary in the same manner as the video tape recorder.

2) Synchronization of an Actual Operation with Display Graphics/Dynamic Graphics When the system is used in the field (although the system may be in a stand-alone type in future), it is necessary that the actual operation by the operator is synchronous with the display content of the display unit. In this case, the operating procedure is broken down into each one unit of operation, and while an actual operation is being carried out, graphics/dynamic graphics of one unit of operation is repeatedly displayed and the display is moved to the graphics/dynamic graphics display of the next operation unit at the point of time when the actual operation of the one unit of operation has been completed.

The present invention having the above-described structure has the following effects.

Since the handling procedure is displayed in three-dimensional graphics or dynamic graphics, the operator can understand accurately and promptly the shapes and procedures.

When a voice message annunciation or a character display is made in synchronism with the display of the graphics/dyanmic graphics, the quantity of transmission information per unit time increases so that errors in handling the element names can be minimized.

By preparing the operating procedure information which meets the technical level of the operator, it is possible to have an output of the display which meets the technical level of the operator in accordance with the request of the operator.

At the request of the operator, it is possible to provide graphics viewed from a desired viewpoint, desired expanded or compressed graphics, desired cross sectional projection graphics and desired partial cross sectional graphics, so that it is possible to organically transmit the structure, system and operating procedure of the target elements.

We claim:

1. A display device for displaying, in a time continuous three-dimensional dynamic scene, sequential images of an assembling/disassembling procedure of an assembly having a plurality of parts, wherein said sequential images of said time continuous, three-dimensional dynamic scene of said assembling/disassembling procedure of said assembly are generated by processing coordinate information of said assembly, said coordinate information being processed to cause movement and/or rotation of said parts of said assembly to graphically represent continuous movement and/or rotation of said parts during said assembling/disassembling procedure and to permit an operator to observe said assembling/disassembling procedure from any desired angles;

wherein information describing said assembling/disassembling procedure is output in synchronism with said sequential images of said time continuous, three-dimensional dynamic scene.

2. A display device according to claim 1 wherein said assembling/disassembling procedure being displayed is a procedure selected from a plurality of procedures.

3. A display device according to claim 1 wherein said parts being displayed are formed using arbitrary coordinate information from opposing viewpoints.

4. A display device according to claim 3, wherein said arbitrary coordinate information of said opposing viewpoints provides coordinate information of an image of a crossection of each of said parts.

5. A display device according to claim 1, wherein said information describing said assembling/disassembling procedure includes character information which describes said assembling/disassembling procedure in synchronism with said dynamic scene.

6. A display device according to claim 5, wherein said character information includes a plurality of levels of character information selectable by an operator, and wherein each level of character information, except a first level of character information, provides a description of said assembling/disassembling procedure including more detail than a preceding level of character information.

7. A display device according to claim 1, wherein said information describing said assembling/disassembling procedure includes voice information which describes said assembling/disassembling procedure in synchronism with said dynamic scene.

8. A display device according to claim 1, wherein a part currently being moved or rotated is displayed in a manner to distinguish said part from others of said parts.

9. A display device according to claim 1, wherein said coordinate information is processed in such a manner as to permit observation of said assembling/disassembling procedure from one of a plurality of desired angles, each of said plurality of desired angles providing a different perspective view of said procedure to assist in assembling/disassembling said assembly.

10. A display device for displaying, in a time continuous three-dimensional dynamic scene, sequential images of an assembling/disassembling procedure of functional elements of an assembly having a plurality of three-dimensional mono-elements, wherein said sequential images of said time continuous, three-dimensional dynamic scene of said assembling/disassembling procedure of said assembly are generated by processing coordinate information of said assembly, said coordinate information being processed to cause movement and/or rotation of said three-dimensional mono-elements of said assembly to graphically represent continuous movement and/or rotation of said three-dimensional mono-elements during said assembling/disassembling procedure and to permit an operator to observe said assembling/disassembling procedure from any desired angles;

wherein information describing said assembling/disassembling procedure is output in synchronism with said sequential images of said time continuous, three-dimensional dynamic scene.

11. A display device according to claim 10, wherein said assembling/disassembling procedure being displayed is a procedure selected from a plurality of procedures.

12. A display device according to claim 10, wherein said mono-elements being displayed are formed using arbitrary coordinate information from opposing viewpoints.

13. A display device according to claim 12, wherein said arbitrary coordinate information of said opposing viewpoints provides coordinate information of an image of a crossection of each of said mono-elements.

14. A display device according to claim 10, wherein said information describing said assembling/disassembling procedure includes character information which describes said assembling/disassembling procedure in synchronism with said dynamic scene.

15. A display device according to claim 14, wherein said character information includes a plurality of levels of character information selectable by an operator, and wherein each level of character information, except a first level of character information, provides a description of said assembling/disassembling procedure including more detail than preceding level of character information.

16. A display device according to claim 10, wherein said information describing said assembling/disassembling procedure includes voice information which describes said assembling/disassembling procedure in synchronism with said dynamic scene.

17. A display device according to claim 10, wherein a three-dimensional mono-element currently being moved or rotated is displayed in a manner to distinguish said three-dimensional mono-element from others of said three-dimensional mono-elements.

18. A display device according to claim 10, wherein said coordinate information is processed in such a manner as to permit observation of said assembling/disassembling procedure from one of a plurality of desired angles, each of said plurality of desired angles providing a different perspective view of said procedure to assist in assembling/disassembling said assembly.

19. A display device for displaying, in a time continuous three-dimensional dynamic scene, sequential scene images of an operating procedure of functional elements of an assembly having a plurality of three-dimensional mono-elements, wherein said sequential images of said time continuous, three-dimensional dynamic scene of said assembling/disassembling procedure of said assembly are generated by processing coordinate information of said assembly, said coordinate information being processed to cause movement and/or rotation of said three-dimensional mono-elements of said assembly to graphically represent continuous movement and/or rotation of said three-dimensional mono-elements during said operating procedure and to permit an operator to observe said assembling/disassembling procedure from any desired angle;

wherein information describing said assembling/disassembling procedure is output in synchronism with said sequential images of said time continuous, three-dimensional dynamic scene.

20. A display device according to claim 19, wherein said assembling/disassembling procedure being displayed is a procedure selected from a plurality of procedures.

21. A display device according to claim 19 wherein said mono-elements being displayed are formed using arbitrary coordinate information from opposing viewpoints.

22. A display device according to claim 21, wherein said arbitrary coordinate information of said opposing viewpoints provides coordinate information of an image of a crossection of each of said mono-elements.

23. A display device according to claim 19, wherein said information describing said assembling/disassembling procedure includes character information which describes said assembling/disassembling procedure in synchronism with said dynamic scene.

24. A display device according to claim 23, wherein said character information includes a plurality of levels of character information selectable by an operator, and wherein each level of character information, except a first level of character information, provides a description of said assembling/disassembling procedure including more detail than a preceding level of character information.

25. A display device according to claim 19, wherein said information describing said assembling/disassembling procedure includes voice information which describes said assembling/disassembling procedure in synchronism with said dynamic scene.

26. A display device according to claim 19, wherein a three-dimensional mono-element currently being moved or rotated is displayed in a manner to distinguish said three-dimensional mono-element from others of said three-dimensional mono-elements.

27. A display device according to claim 19, wherein said coordinate information is processed in such a manner as to permit observation of said assembling/disassembling procedure from one of a plurality of desired angles, each of said plurality of desired angles providing a different perspective view of said procedure to assist in assembling/disassembling said assembly.

28. A display device for displaying, in a time continuous three-dimensional dynamic scene, sequential images of an assembling/disassembling procedure of an assembly having a plurality of three-dimensional parts, wherein said sequential images of said time continuous, three-dimensional dynamic scene of said assembling/disassembling procedure of said assembly are generated by processing coordinate information of said assembly, said coordinate information being processed to cause movement and/or rotation of said three-dimensional parts of said assembly to graphically represent continuous movement and/or rotation of said three-dimensional parts during said assembling/disassembling procedure and to permit an operator to observe said assembling/disassembling procedure from any desired angle;

wherein information describing said assembling/disassembling procedure is output in synchronism with said sequential images of said time continuous, three-dimensional dynamic scene.

29. A display device according to claim 28, wherein said assembling/disassembling procedure being displayed is a procedure selected from a plurality of procedures.

30. A display device according to claim 28, wherein said parts being displayed are formed using arbitrary coordinate information from opposing viewpoints.

31. A display device according to claim 30, wherein said arbitrary coordinate information of said opposing viewpoints provides coordinate information of an image of a crossection of each of said parts.

32. A display device according to claim 28, wherein said information describing said assembling/disassembling procedure includes character information which describes said assembling/disassembling procedure in synchronism with said dynamic scene.

33. A display device according to claim 32, wherein said character information includes a plurality of levels of character information selectable by an operator, and wherein each level of character information, except a first level of character information, provides a description of said assembling/disassembling procedure including more detail than preceding level of character information.

34. A display device according to claim 32, wherein said information describing said assembling/disassembling procedure includes voice information which describes said assembling/disassembling procedure in synchronism with said dynamic scene.

35. A display device according to claim 32, wherein a three-dimensional part currently being moved or rotated is displayed in a manner to distinguish said three-dimensional part from others of said three-dimensional parts.

36. A display device according to claim 28, wherein said coordinate information is processed in such a manner as to permit observation of said assembling/disassembling procedure from one of a plurality of desired angles, each of said plurality of desired angles providing a different perspective view of said procedure to assist in assembling/disassembling said assembly.

37. A display device for displaying, in a time continuous three-dimensional dynamic scene, sequential images of an assembling/disassembling procedure of functional elements of an assembly having a plurality of three-dimensional mono-elements, wherein said sequential images of said time continuous, three-dimensional dynamic scene of said assembling/disassembling procedure of said assembly are generated by processing coordinate information of said assembly, said coordinate information being processed to cause movement and/or rotation of said three-dimensional mono-elements of said assembly to graphically represent continuous movement and/or rotation of said three-dimensional mono-elements during said assembling/disassembling procedure and to permit an operator to observe said assembling/disassembling procedure from any desired angle;

wherein information describing said assembling/disassembling procedure is output in synchronism with said sequential images of said time continuous, three-dimensional dynamic scene.

38. A display device according to claim 37, wherein said assembling/disassembling procedure being displayed is a procedure selected from a plurality of procedures.

39. A display device according to claim 37, wherein said mono-elements being displayed are formed using arbitrary coordinate information from opposing viewpoints.

40. A display device according to claim 39, wherein said arbitrary coordinate information of said opposing viewpoints provides coordinate information of an image of a crossection of each of said mono-elements.

41. A display device according to claim 37, wherein said information describing said assembling/disassembling procedure includes character information which describes said assembling/disassembling procedure in synchronism with said dynamic scene.

42. A display device according to claim 41, wherein said character information includes a plurality of levels of character information selectable by an operator, and wherein each level of character information, except a first level of character information, provides a description of said assembling/disassembling procedure including more detail than preceding level of character information.

43. A display device according to claim 37, wherein said information describing said assembling/disassembling procedure includes voice information which describes said assembling/disassembling procedure in synchronism with said dynamic scene.

44. A display device according to claim 37, wherein a three-dimensional mono-element currently being moved or rotated is displayed in a manner to distinguish said three-dimensional mono-element from others of said three-dimensional mono-elements.

45. A display device according to claim 37, wherein said coordinate information is processed in such a manner as to permit observation of said assembling/disassembling procedure from one of a plurality of desired angles, each of said plurality of desired angles providing a different perspective view of said procedure to assist in assembling/disassembling said assembly.

46. A display device for displaying, in a time continuous three-dimensional dynamic scene, sequential images of an operating procedure of functional elements of an assembly having a plurality of three-dimensional mono-elements, wherein said sequential images of said time continuous, three-dimensional dynamic scene of said assembling/disassembling procedure of said assembly are generated by processing coordinate information of said assembly, said coordinate information being processed to cause movement and/or rotation of said three-dimensional mono-elements of said assembly to graphically represent continuous movement and/or rotation of said three-dimensional mono-elements during said operating procedure and to permit an operator to observe said operating procedure from any desired angle;

wherein information describing said assembling/disassembling procedure is output in synchronism with said sequential images of said time continuous, three-dimensional dynamic scene.

47. A display device according to claim 46, wherein said assembling/disassembling procedure being displayed is a procedure selected from a plurality of procedures.

48. A display device according to claim 46, wherein said mono-elements being displayed are formed using arbitrary coordinate information from opposing viewpoints.

49. A display device according to claim 48, wherein said arbitrary coordinate information of said opposing viewpoints provides coordinate information of an image of a crossection of each of said mono-elements.

50. A display device according to claim 46, wherein said information describing said assembling/disassembling procedure includes character information which describes said assembling/disassembling procedure in synchronism with said dynamic scene.

51. A display device according to claim 50, wherein said character information includes a plurality of levels of character information selectable by an operator, and wherein each level of character information, except a first level of character information, provides a description of said assembling/disassembling procedure including more detail than a preceding level of character information.

52. A display device according to claim 46, wherein said information describing said assembling/disassembling procedure includes voice information which describes said assembling/disassembling procedure in synchronism with said dynamic scene.

53. A display device according to claim 46, wherein a three-dimensional mono-element currently being moved or rotated is displayed in a manner to distinguish said three-dimensional mono-element from others of said three-dimensional mono-elements.

54. A display device according to claim 46, wherein said coordinate information is processed in such a manner as to permit observation of said assembling/disassembling procedure from one of a plurality of desired angles, each of said plurality of desired angles providing a different perspective view of said procedure to assist in assembling/disassembling said assembly.

55. A display device for displaying, in time a continuous dynamic scene, sequential images of an operating procedure of an assembly having a plurality of mono-elements and functional elements, said operating procedure being one of an assembling/disassembling procedure of said assembly and a handling procedure of said assembly, comprising:

a man-machine device for transmitting a command from an operator to a processing device;

a graphic information memory device for storing graphic information of mono-elements and functional elements corresponding to items of procedure information;

a storage for storing a graphic information database having therein said items of procedure information representing operating procedures;

wherein said processing device generates information concerning an operating procedure by processing graphic information from said graphic information memory device and items of procedure information from said graphic information database to cause movement and/or rotation of said mono-elements and said functional elements of said assembly in response to a command from said man-machine device; and a display for displaying sequential images based on said information generated by said processing device to graphically represent continuous movement and/or rotation of said mono-elements and functional elements during said operating procedure which forms a part of a continuous dynamic scene;

wherein information describing said operating procedure is output in synchronism with said sequential images.

56. A display device for displaying an operating procedure according to claim 55, wherein each item of procedure information comprises coordinate information of a particular viewpoint.

57. A display device according to claim 55, wherein said operating procedure being displayed is a procedure selected from a plurality of procedures.

58. A display device according to claim 55, wherein said mono-elements and functional elements being displayed are formed using arbitrary coordinate information from opposing viewpoints.

59. A display device according to claim 58, wherein said arbitrary coordinate information of said opposing viewpoints provides coordinate information of an image of a crossection of each of said mono-elements and functional elements.

60. A display device according to claim 55, wherein said information describing said operating procedure includes character information which describes said operation procedure in synchronism with said dynamic scene.

61. A display device according to claim 60, wherein said character information includes a plurality of levels of character information selectable by an operator, and wherein each level of character information, except a first level of character information, provides a description of said operating procedure including more detail than a preceding level of character information.

62. A display device according to claim 55, wherein said information describing said operating procedure includes voice information which describes said operating procedure in synchronism with said dynamic scene.

63. A display device according to claim 55, wherein a mono-element and functional element currently being moved or rotated is displayed in a manner to distinguish said mono-element and functional element from others of said mono-elements and functional elements.

64. A display method for displaying, in a time-continuous three-dimensional dynamic scene, sequential images of an operating procedure based on mono-element graphic information which specifies a shape of a mono-element, items of operating procedure information each specifying an operating procedure based on location information, time information and direction information, and dynamic information which is generated by processing said mono-element graphic information and an item of operating procedure information to cause movement and/or rotation of said mono-element to graphically represent continuous movement and/or rotation of said mono-element during said operating procedure specified by said item of operating procedure information, said operating procedure being one of an assembling/disassembling procedure of said assembly and a handling procedure of said assembly;

wherein information describing said operating procedure is output in synchronism with said sequential images.

65. A display method according to claim 64, wherein said operating procedure being displayed is a procedure selected from a plurality of procedures.

66. A display method according to claim 64, wherein said mono-elements being displayed are formed using arbitrary coordinate information from opposing viewpoints.

67. A display method according to claim 66, wherein said arbitrary coordinate information of said opposing viewpoints provides coordinate information of an image of a crossection of each of said mono-elements.

68. A display method according to claim 64, wherein said information describing said operating procedure includes character information which describes said operating procedure in synchronism with said dynamic scene.

69. A display method according to claim 68, wherein said character information includes a plurality of levels of character information selectable by an operator, and wherein each level of character information, except a first level of character information, provides a description of said operating procedure including more detail than a preceding level of character information.

70. A display method according to claim 64, wherein said information describing said assembling/disassembling procedure includes voice information which describes said assembling/disassembling procedure in synchronism with said dynamic scene.

71. A display method according to claim 64, wherein said mono-element currently being moved or rotated is displayed in a manner to distinguish said mono-element from other mono-elements.

72. A display system for displaying an operating procedure having a plurality of mono-elements, wherein in a time continuous three-dimensional dynamic scene, sequential images of said operating procedure are displayed in a display device based on three-dimensional dynamic scene information of said operating procedure which is generated by processing shape information of said mono-elements and items of operating procedure information related to said operating procedure to cause manipulation of said mono-elements to graphically represent continuous manipulation of said mono-elements during said operating procedure, said shape information of said mono-elements being three-dimensional coordinate information and said items of operating procedure information being three-dimensional coordinate information, time information and direction information, said operating procedure being one of an assembling/disassembling procedure of said assembly and a handling procedure of said assembly;

wherein information describing said operating procedure is output in synchronism with said sequential images.

73. A display system according to claim 72, wherein said operating procedure being displayed is a procedure selected from a plurality of procedures.

74. A display system according to claim 72, wherein said mono-elements being displayed are formed using arbitrary coordinate information from opposing viewpoints.

75. A display system according to claim 74, wherein said arbitrary coordinate information of said opposing viewpoints provides coordinate information of an image of a crossection of each of said mono-elements.

76. A display system according to claim 72, wherein said information describing said operating procedure includes character information which describes said operating procedure in synchronism with said dynamic scene.

77. A display system according to claim 76, wherein said character information includes a plurality of levels of character information selectable by an operator, and wherein each level of character information, except a first level of character information, provides a description of said operating procedure including more detail than a preceding level of character information.

78. A display system according to claim 72, wherein said information describing said operating procedure includes voice information which describes said operating procedure in synchronism with said dynamic scene.

79. A display device according to claim 72, wherein a mono-element currently being moved or rotated is displayed in a manner to distinguish said mono-element from others of said mono-elements.

80. A display system for displaying, in time a continuous dynamic scene, sequential images of an operating procedure having a plurality of mono-elements, comprising:

mono-element graphic information generating means for specifying shapes of said mono-elements based on position coordinate information;

operating procedure information generating means for specifying items of operating procedure information related to said operation procedure based on position coordinate information, time information and direction information;

means for generating three-dimensional dynamic scene information of said operating procedure by processing said mono-elements and said items of operating procedure information to cause manipulation of said mono-elements;

a display device for displaying said sequential images of said continuous three-dimensional dynamic scene based on said three-dimensional dynamic scene information of said operating procedure to graphically represent continuous manipulation of said mono-elements during said operating procedure, said operating procedure being one of an assembling/disassembling procedure of said assembly and a handling procedure of said assembly;

wherein information describing said operating procedure is output in synchronism with said sequential images.

81. A display system according to claim 80, wherein said operating procedure being displayed is a procedure selected from a plurality of procedures.

82. A display system according to claim 80, wherein said mono-elements being displayed are formed using arbitrary coordinate information from opposing viewpoints.

83. A display system according to claim 82, wherein said arbitrary coordinate information of said opposing viewpoints provides coordinate information of an image of a crossection of each of said mono-elements.

84. A display system according to claim 80, wherein said information describing said operating procedure includes character information which describes said operating procedure in synchronism with said dynamic scene.

85. A display system according to claim 84, wherein said character information includes a plurality of levels of character information selectable by an operator, and wherein each level of character information, except a first level of character information, provides a description of said operating procedure including more detail than a preceding level of character information.

86. A display system according to claim 80, wherein said information describing said operating procedure includes voice information which describes said operating procedure in synchronism with said dynamic scene.

87. A display system according to claim 80, wherein a mono-element currently being moved or rotated is displayed in a manner to distinguish said mono-element from others of said mono-elements.

\* \* \* \* \*